(12) United States Patent  (10) Patent No.: US 8,396,754 B2
Dooley et al.  (45) Date of Patent: Mar. 12, 2013

(54) SYSTEM AND METHOD FOR AN ELECTRONIC GIFT KEY

(75) Inventors: Christopher P. Dooley, New Canaan, CT (US); Loren Taylor, Chatham, NJ (US); Paul S. Nielsen, Saratoga Springs, NY (US); Gwen Nielsen, legal representative, Saratoga Springs, NY (US)

(73) Assignees: Product Spring, LLC, New Canaan, CT (US); Taylored Concepts, LLC, Chatham, NJ (US)

( * ) Notice: Subject to any disclaimer, the term of this patent is extended or adjusted under 35 U.S.C. 154(b) by 0 days.

(21) Appl. No.: 13/355,279

(22) Filed: Jan. 20, 2012

(65) Prior Publication Data

US 2012/0123827 A1  May 17, 2012

Related U.S. Application Data

(63) Continuation-in-part of application No. 12/912,874, filed on Oct. 27, 2010, now Pat. No. 8,112,315, which is a continuation of application No. 12/192,445, filed on Aug. 15, 2008, now Pat. No. 8,086,494.

(60) Provisional application No. 60/966,818, filed on Aug. 30, 2007.

(51) Int. Cl.
*G06Q 30/00*  (2006.01)

(52) U.S. Cl. ............................................. 705/26.1
(58) Field of Classification Search ............. 705/26.1, 705/27.1, 27.2, 64; 709/201–203; 235/441; 345/166; 380/278
See application file for complete search history.

(56) References Cited

U.S. PATENT DOCUMENTS

| 6,850,248 | B1 * | 2/2005 | Crosby et al. ................. 345/619 |
| 2003/0041110 | A1 * | 2/2003 | Wenocur et al. ............... 709/206 |
| 2007/0145734 | A1 * | 6/2007 | Wen et al. ...................... 283/67 |

* cited by examiner

*Primary Examiner* — Mary Cheung
(74) *Attorney, Agent, or Firm* — Michael Crilly, Esq.

(57) ABSTRACT

A system and method facilitating delivery of a fully-integrated physical item providing access to non-physical content is presented. The method includes enabling access to an electronic greeting card, exclusive content, promotion, and/or store credit from a remote system after a gift key is linked to a local system. The system includes a local system and a gift key facilitating access to an electronic greeting card, exclusive content, promotion, and/or store credit after linkage between the local system and the gift key. The gift key includes a decorative cover, an integrated circuit, and an antenna or physical connector. The local system is a personal computer, a laptop computer, a handheld computer, a mobile phone, a smartphone, a tablet computer, or a Smart TV. A gift key could be disposed along a box, a bag, a ribbon, an envelope, or a gift wrapping or configured as a sticker with an adhesive backing.

39 Claims, 23 Drawing Sheets

SYSTEM AND METHOD FOR AN ELECTRONIC GIFT KEY

CROSS REFERENCE TO RELATED APPLICATIONS

This application is a continuation-in-part of U.S. Non-Provisional application Ser. No. 12/912,874 filed Oct. 27, 2010 which is a divisional application of U.S. Non-Provisional application Ser. No. 12/192,445 filed Aug. 15, 2008, now U.S. Pat. No. 8,086,494, which claims benefit of U.S. Provisional Application No. 60/966,818 filed Aug. 30, 2007, all entitled System and Method for an Electronic Gift Key. The subject matters of the prior applications are incorporated in their entirety herein by reference thereto.

FEDERALLY SPONSORED RESEARCH AND DEVELOPMENT

None.

BACKGROUND OF THE INVENTION

1. Field of the Invention

The present invention generally relates to an electronic gift key enabling a party to access an electronic greeting card, exclusive content, promotions, and/or store credits. Specifically, the invention includes a system and method and an item therefore whereby an electronic gift key, comprising a decorative cover with integrated circuit, memory, and interface, is linkable to a local system either physically or wirelessly, thereafter launching a website at a host system so as to allow a purchaser to customize a greeting card or a recipient to access a customized greeting card, promotions, and/or exclusive content at the host site and/or redeem store credits associated with the gift key at a retail and/or host website.

2. Background

Gift certificates and gift cards enjoy ever increasing popularity because of their convenience and ability to allow a recipient thereof to redeem store credits for the purchase of items desired by a recipient, rather than gifts chosen by a purchaser.

Gift certificates and cards are essentially the same, except that gift cards automate the checkout and accounting processes via a barcode or magnetic strip which is scanned or swiped at the time of purchase and use.

Gift cards may or may not have an assigned value prior to purchase. For example, some gift cards have no value until they are sold, at which time a cashier enters the amount which a buyer wishes to associate with the card. This information is rarely stored on the card, but rather stored in a database operated by a retailer which is cross referenced to the card via an identifier when a transaction is processed. Other gift cards, often referred to as stored-value cards, have a fixed value which is stored directly on the card and updated after each transaction. Stored-value cards eliminate the need for checkout and accounting processes at a remote site, thus simplifying network support requirements.

Counterfeiting is a major problem with gift cards typically mitigated via encryption methods and card design. Encryption methods are generally not robust given the relatively low monetary value assigned to gift cards. In terms of card design, a magnetic strip is often placed at a location along the card to prevent compatibility with many read/write devices.

Furthermore, gift certificates and gift cards require a purchaser to buy a non-customized greeting card separate and apart from the certificate or card. This reduces both perceived and actual convenience and value of gift certificates and cards.

Finally, gift certificates and cards require a purchaser or recipient to travel to a physical location operated by a retailer for the purpose of redemption. As such, many gift certificates and cards are never used. These lost transactions also include lost interactions during which advertising and marketing activities are possible to encourage impulse purchases beyond the value associated with the certificate or card. Some gift cards are redeemable online; however, the redemption process requires a purchaser or a recipient to manually enter one or more codes via a computer communicating with the internet.

Electronic greeting cards are described by Schutz in U.S. patent application Ser. No. 09/747,506 entitled Digital Computer System and Methods for Implementing a Financial Transaction and Karas et al. in U.S. patent application Ser. No. 10/313,934 entitled Electronic Gift Linking. Schutz teaches customization of an electronic greeting card. Schutz does not teach customizing or viewing a greeting card when a physical gift key is linked to a computer and does not associate a store credit with a gift key. Karas describes an electronic greeting card including a store credit associated with the electronic greeting card. Karas does not teach customizing or viewing a greeting card when a physical gift key is linked to a computer and does not associate a store credit with a gift key.

Hileman et al. describes a key and a gift card in U.S. patent Ser. No. 10/228,017 entitled Three-Party Authentication Method and System for E-Commerce Transactions. The key is a non-physical number divided into two or more portions. A portion of the key is communicated to a gift recipient via a physical item, namely, a gift card. Both key and gift card are required to activate the gift card and redeem money, goods, or services. In the present invention, the gift key is a self-contained single item enabling a recipient to immediately redeem store credits and access an electronic greeting card, an exclusive content, or a promotion. In Hileman, both the key and the gift card are required to redeem money, goods, or services. The gift card in Hileman not only unlocks access to credits but also includes a greeting to the recipient. In the present invention, the gift key is used to launch a website, when connected to a local system, which accesses an electronic greeting card, exclusive content, or promotion. Unlike Hileman, the present invention bifurcates the greeting card aspect of a gift from the physical item, namely, the gift key and presents a greeting card in an electronic form.

As is readily apparent from the discussions above, the related arts do not include a decorative item physically possessed by a purchaser or a recipient whereby the item enables the purchaser to electronically customize online content for the recipient and further enables the recipient to access the customized electronic greeting card, exclusive content, promotions, and/or redeem store credits at one or more online retail sites.

Therefore, what is required is a system and method which allow for the purchase, transfer, and use of a single physically-based gift item, enabling access to an electronic greeting card, exclusive content, promotions, and/or redeemable store credits via the internet in a secure, convenient, customizable, and controllable manner.

SUMMARY OF THE INVENTION

An object of the present invention is to provide a system and method which allow for the purchase, transfer, and use of a single physically-based gift item enabling access to an electronic greeting card, exclusive content, promotions, and/or redeemable store credits via the internet in a secure, convenient, customizable, and controllable manner.

In accordance with embodiments of the invention, the method includes enabling access via a local system to an electronic greeting card, a store credit, an exclusive content, or a promotion from a remote system after a gift key is wirelessly or physically linked to a local system. The local and remote systems are communicable via a network. The gift key includes a decorative cover, an integrated circuit, and an antenna or a physical interface. The integrated circuit and antenna or integrated circuit and physical interface are disposed on the decorative cover. The antenna or physical interface is communicable with the integrated circuit. The integrated circuit is linkable to the local system via the antenna or physical interface.

In accordance with embodiments of the invention, the system includes a local system and a gift key. The local system is communicable with a remote system via a network. The gift key includes a decorative cover, an integrated circuit, and an antenna or a physical interface. The integrated circuit and antenna or integrated circuit and physical interface are disposed on the decorative cover. The antenna or physical interface is communicable with the integrated circuit. The integrated circuit is linkable to the local system via the antenna or physical interface. An electronic greeting card, store credit, exclusive content, or promotion is accessible after the gift key is linked to the local system.

In accordance with embodiments of the invention, the gift key could include a decorative cover, an integrated circuit, and an antenna or a physical interface. The integrated circuit and antenna or physical interface are disposed along the decorative cover. The antenna or physical interface is communicable with the integrated circuit. The integrated circuit is wirelessly linkable to a local system via the antenna or physically linkable to the local system via the physical interface. The local system is communicable with a remote system via a network. The gift key enables access to an electronic greeting card, store credit, exclusive content, or promotion from the remote system after linkage of the gift key to the local system. The decorative cover could be flat in nature or three-dimensional examples including, but not limited to, wallet-size cards, self-adhesive stickers, gift wrap, envelopes, gift bags, ribbons, gift boxes, gift trims, and gift bows. The decorative cover ensures the gift key has play value and/or visual appeal before and after the electronic greeting card is viewed, exclusive content experienced, promotions acquired, and/or store credits are depleted. Electronics within the gift key could contain a serial, account, identifier and/or global unique identifier (GUID) number used as a cross reference to uniquely identify the gift key for accessing product features, greeting card, exclusive content, promotions and/or store credits.

The wireless and physical interfaces enable the gift key to be linked to a personal computer, laptop computer, handheld computer, mobile phone, smartphone, tablet computer, Smart TV system or other similar device capable of communication via wire or wireless means over a network. A Near Field Communication or other wireless communication protocol could be used to link with the local system, thereafter automatically launching a web browser to a host and/or retailer website via Internet Explorer®, a registered trademark of Microsoft Corporation, Safari®, a registered trademark of Apple, Inc., Android®, a registered trademark of Google, Inc., or other software which enables remote communication via an electronic device. The serial and/or GUID number is communicated from the gift key to the host or retailer website via encryption protocols, one example being a 128-bit encryption format. The GUID number could be encrypted into the web address and deciphered by the host system.

A purchaser connects or links the gift key to a local system prior to physically transferring the key to a recipient. The gift key communicates a web address for the host site to the web browser executable on a computer. After security protocols are verified with the host site, a website is automatically launched so that the purchaser might view the store credits, exclusive content and/or promotions accessible with the key and customize an electronic greeting card which resides on the host website. The host website allows the purchaser to choose a card type, non-limiting examples being a holiday, birthday, or other special event, and to embed text, pictures, or videos into viewing areas on the electronic greeting card creating a personalized message to the recipient. The electronic greeting card and/or store credit information resides on the host site for later access by a recipient.

After physical acceptance of the gift key by a recipient from a purchaser, the recipient connects or links the gift key to a local system. The gift key communicates a web address for the host site to the web browser executable on the system. After security protocols are executed and satisfied between the gift key and the host system, a website is automatically launched so that the recipient might view the store credits, promotions and/or exclusive content accessible with the key and/or the electronic greeting card prepared by the purchaser, as well as access a retail website for online shopping and redemption of store credits.

In accordance with embodiments of the invention, the recipient could access theme related content corresponding to the appearance of the gift key at the host website. For example, a gift key having a character-based theme might allow access to games, movie trailers, facts and biographic data, and other media content associated with the character.

In accordance with embodiments of the invention, the host website could include online links to one or more retailers when store credits are not restricted to a specific retailer. Links could be specific to the type of gift key so as to target and guide a consumer's shopping experience and/or increase sales of a preferred retailer. For example, a character based gift key could automatically forward a recipient to one or more specific web pages at a retailer's online site.

Several advantages are offered by the described invention. The gift key provides both electronic and physical functionalities which in combination enhance the collectability, appeal, and play value of the gift item. In some embodiments, the gift key cover could be used to decorate or conceal the gift item before it is opened by the recipient. Decorative aspects and electronic functionality of the gift key provide for an overall package design which is highly customizable for a specific recipient. Electronic functionality of the gift key maximizes the flexibility afforded to the recipient in terms of use and redemption options. Electronic functionality of the gift key facilitates access to theme specific content by a recipient so as to target and guide purchasing behavior. Physical aspects of the gift key provide a fully integrated package design which avoids the cost and complexities of supplemental gift wrapping.

REFERENCE NUMERALS

| | |
|---|---|
| 1 | Local system |
| 2 | Network |
| 3 | Host system |
| 4a-4f | Retailer system |
| 5 | Gift key |
| 6 | Port |
| 7 | Physical interface |
| 8a, 8b | Decorative Cover |
| 9 | Circuit board |
| 10 | Integrated circuit |
| 11 | Wire assembly |
| 12 | Hook |
| 13 | Chain |
| 14 | Button |
| 15 | Interface |
| 16 | Wireless interface |
| 17 | Wireless interface |
| 18 | Light |
| 19 | Cover |
| 20 | Card creator webpage |
| 21 | CARD TYPE button |
| 22 | DESIGN button |
| 23 | Preview window |
| 24 | NEXT button |
| 25 | SAVE button |
| 26 | EXIT button |
| 27 | UPLOAD FILE button |
| 28 | Upload frame |
| 29 | ACTIVATION button |
| 30 | Webpage |
| 31 | INTRODUCTION button |
| 32 | TEXT button |
| 33 | CUSTOM TEXT button |
| 34 | SIGNATURE button |
| 35 | Preview window |
| 36 | PREVIOUS PAGE button |
| 37 | SAVE button |
| 38 | EXIT button |
| 39 | Display frame |
| 40 | Greeting card webpage |
| 41 | Cover page frame |
| 42 | Text page frame |
| 43 | RETAILER button |
| 44 | EXIT button |
| 45 | Gift value field |
| 46 | Retailer field |
| 50-53 | Step |
| 54a, 54b | Appendage |
| 55 | Nub |
| 56 | Channel |
| 57a, 57b | Opening |
| 58a, 58b | Opening |
| 59a, 59b | Opening |
| 60 | Loop |
| 61 | Retailer level |
| 62 | Purchaser level |
| 63 | Host level |
| 64 | Recipient level |
| 65 | Retailer network |
| 66-82 | Step |
| 83 | Slot |
| 84 | Landing webpage |
| 85 | Advertisement frame |
| 86 | CREATE CARD button |
| 87 | VIEW CARD button |
| 88 | ONLINE SHOPPING button |
| 89 | ONLINE CONTENT button |
| 90 | EXIT button |
| 91 | Antenna |
| 92 | Adhesive layer |
| 93 | Backing layer |
| 94 | Indicia |
| 95 | Box top |
| 96 | Side |
| 97 | Bag |
| 98 | Handle |
| 99 | Interior surface |
| 100 | Exterior surface |
| 101 | Gusset |
| 102 | Crease |
| 103 | Self-adhesive tab |
| 104 | Ribbon |
| 105 | Step |
| 106 | Envelope |
| 107-109 | Step |
| 110 | SHARE button |
| 111 | PRINT button |
| 112-128 | Step |

BRIEF DESCRIPTION OF THE INVENTION

Additional aspects, features, and advantages of the invention will be understood and will become more readily apparent when the invention is considered in the light of the following description made in conjunction with the accompanying drawings.

DETAILED DESCRIPTION

Figure 1:
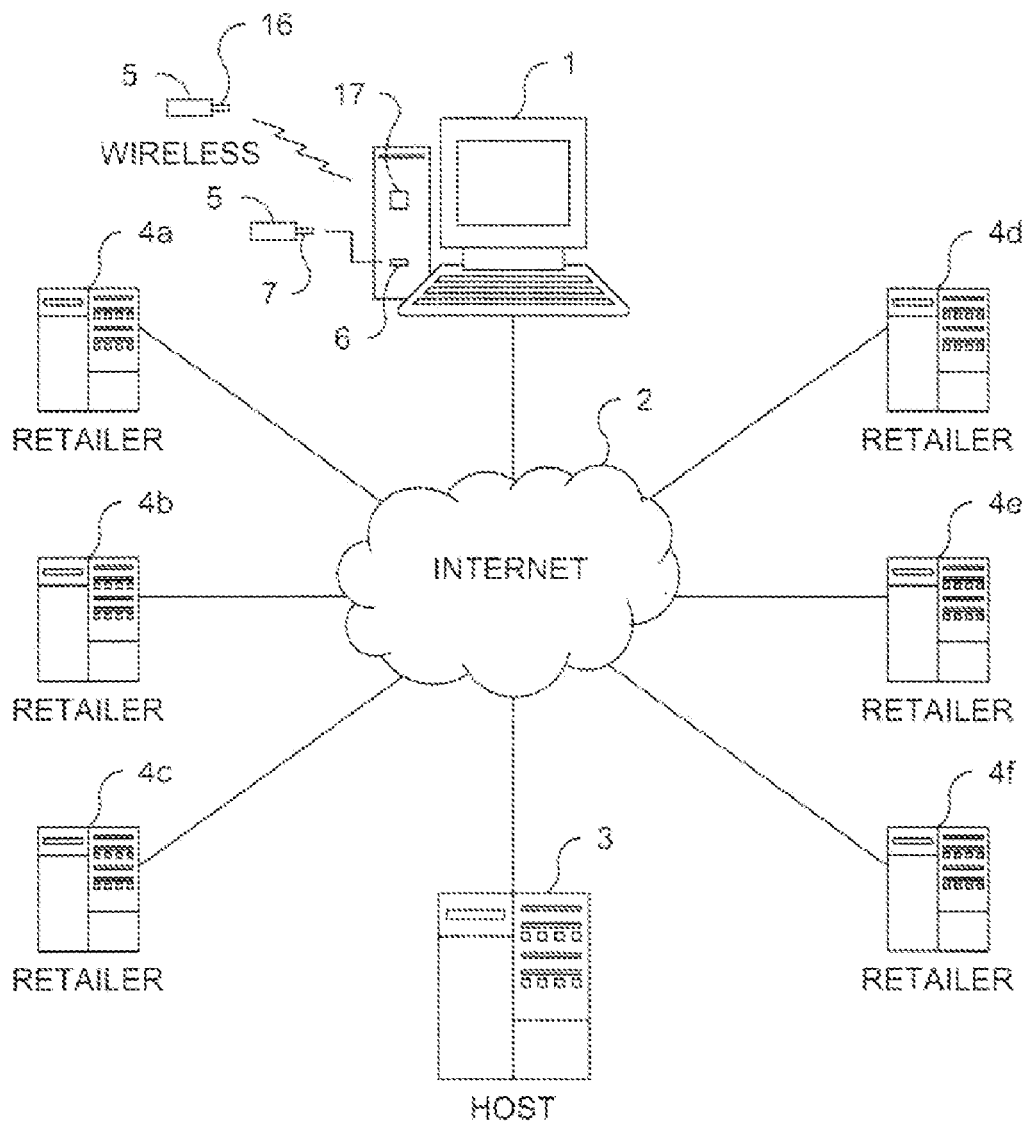
FIG. 1 is a schematic diagram illustrating interaction between a gift key linkable to a local system either physically or wirelessly, a host site, and one or more retailer sites via the internet in accordance with an embodiment of the invention.

Reference will now be made in detail to several preferred embodiments of the invention that are illustrated in the accompanying drawings. Wherever possible, same or similar reference numerals are used in the drawings and the description to refer to the same or like parts or steps. The drawings are in simplified form and are not to precise scale. The words communicate, connect, couple, link, and similar terms with their inflectional morphemes do not necessarily denote direct and immediate connections, but also include connections through intermediary elements or devices.

Referring now to FIG. 1, embodiments of the invention include a gift key 5 having a physical interface 7 which is attachable or linkable to a port 6 residing on a local system 1 or a wireless interface 16 which communicates with a complimentary wireless interface 17 residing on a local system 1. The local system 1 could include a personal computer, laptop computer, handheld computer, mobile phone, smartphone, tablet computer, Smart TV system or other similar device capable of communicating via wire or wireless means over a network 2. Smart TV system could further include internet enabled Televisions, set top boxes, DVD players and game consoles. The network 2 could be a communication system which allows two or more local systems to communicate in an inter-connected fashion either locally or globally, one non-limiting example being the Internet. A network 2 could also include wire and/or wireless systems which allow for the communication of data, voice, video, and other content between a local system 1 and one or more remote systems, examples including, but not limited to, another local system 1, a host system 3, or a retailer system 4a-4f. Communication by and between the local system 1, network 2, host system 3, and retailer systems 4a-4f is via protocols and methods understood within the art.

The network 2 facilitates communication with a host system 3 and at least one retailer system 4a-4f. Host system 3 and retailer systems 4a-4f could include computer hardware and software which display a website or the like over a network 2 and allow communication therewith by one or more local systems 1.

The host system 3 communicates with a gift key 5 via the local system 1 so as to allow a purchaser of the gift key 5 to customize a greeting card associated with the gift key 5 via a serial or global unique identifier (GUID) number stored on a read-only memory (ROM) or similar device housed within the gift key 5. The host system 3 also enables a recipient of a gift key 5 to view the greeting card via a local system 1. The host system 3 further communicates with a gift key 5 so as to allow a recipient to redeem store credits associated with the gift key 5 via a serial number, GUID number, or other similar security identifier stored electronically within the gift key 5.

The retailer systems 4a-4f are accessible via the host system 3 and graphically displayed on the local system 1. Each retailer system 4a-4f controls a website or the like which displays goods and services for sale and allows for the purchase thereof. Although six retailer systems 4a-4f are described in FIG. 1, the number of retailer systems 4a-4f could be one or more systems operated by one or more retailers or the like.

Figure 2:
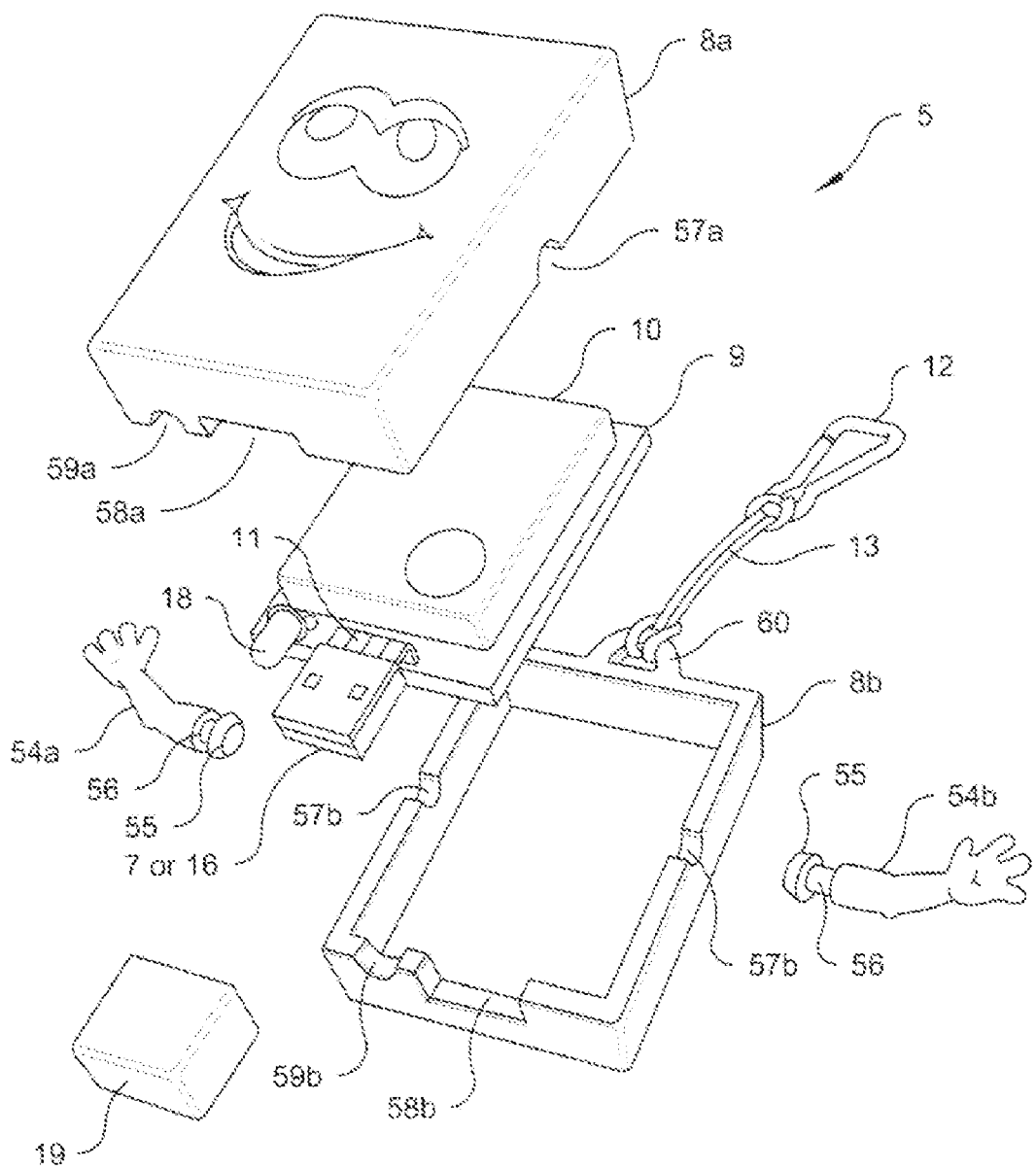
FIG. 2 is an exploded view illustrating decorative cover, circuit board, integrated circuit, and interface for an exemplary gift key in accordance with an embodiment of the invention.
Figure 3A:
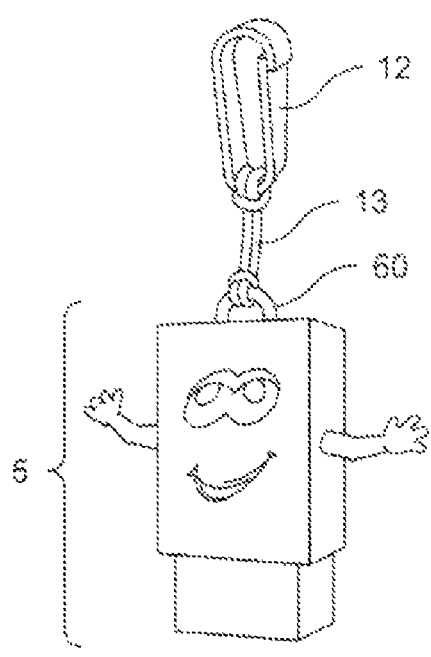
FIG. 3a is a front side perspective view illustrating an exemplary decorative gift key configured as a keychain and having a movable USB plug fully retracted within a decorative cover in accordance with an embodiment of the invention.
Figure 3B:
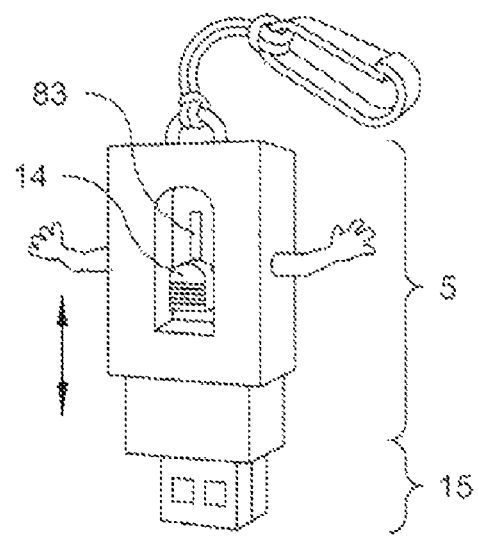
FIG. 3b is a rear side perspective view illustrating an exemplary decorative gift key configured as a keychain and having a movable USB plug fully extended from a decorative cover in accordance with an embodiment of the invention.

Referring now to FIG. 2, an exemplary gift key 5 is shown including a two-piece decorative cover 8a, 8b disposed about and protecting a circuit board 9, an integrated circuit 10, a wire assembly 11, and a physical interface 7, and/or a wireless interface 16. In some embodiments, the decorative cover 8a, 8b could be composed of a plastic composition and include a decorative design which is printed, molded thereon, or attached thereto. For example, the decorative cover 8a, 8b could be shaped as a cartoon character as shown in FIGS. 2, 3a, 3b or have the appearance of any object suitable as a gift. In another example, a two-dimensional element could be a thin plastic item such as a flexible polymer or rigid plastic, the latter approximating the shape and size of a wallet-sized card. Also, the decorative cover 8a, 8b, could include two or more elements which are movable so as to change the overall shape and appearance of the gift key 5. The decorative cover 8a, 8b is intended to support and protect at least the elements mentioned herein. In other embodiments, the decorative cover 8a and/or 8b could be a flexible or rigid element that is either two-dimensional or three-dimensional in shape. In yet further embodiments, components comprising the gift key 5 could be attached to a decorative cover 8a in an open configuration.

A variety of circuitry designs and connectors could reside within the gift key 5. For example, a circuit board 9 could be fastened or adhered to the decorative cover 8a or 8b and thereafter attached to the integrated circuit 10. A physical interface 7, one example being a USB connector, or a wireless interface 16 could be attached to the decorative cover 8a, 8b via a fastener or adhesive and, thereafter, electrically connected to the integrated circuit 10 via a wire assembly 11. Elements of the decorative cover 8a, 8b are joined and fixed via a fastener or an adhesive to form a protective covering about the electronic components described herein.

Figure 11A:
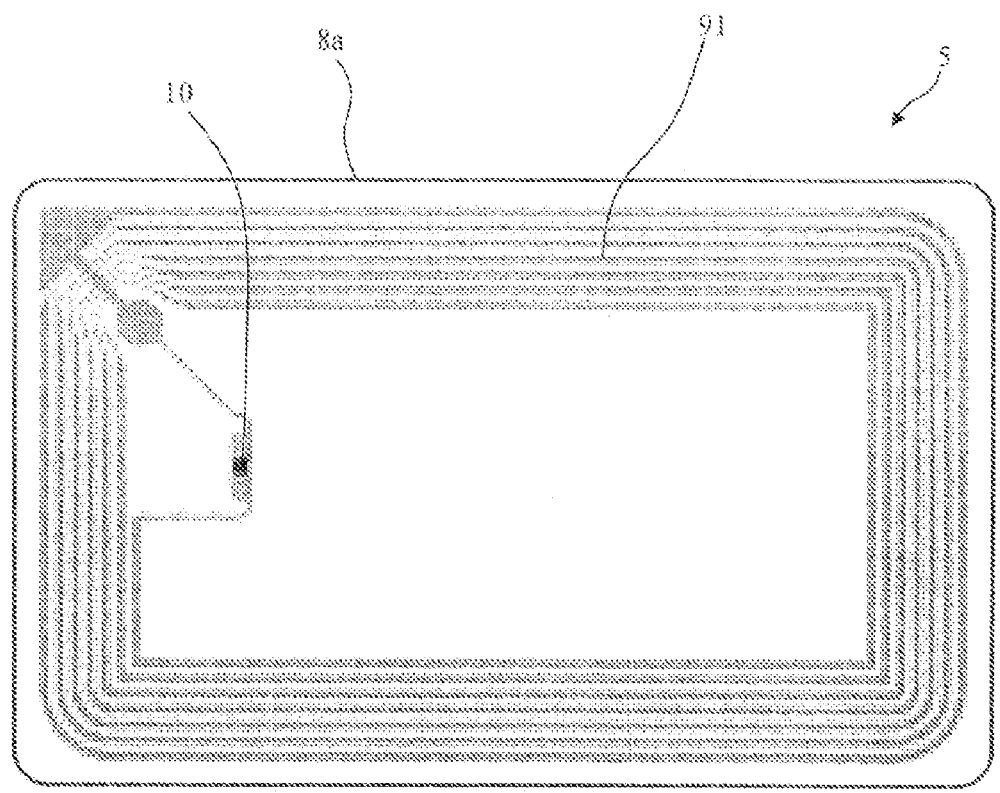
FIG. 11a is a front perspective view showing an antenna enabled by Near Field Communication or RFID and an integrated circuit contacting a flat decorative cover in accordance with an embodiment of the invention.

Components comprising the gift key 5 could be powered by the local system 1 via the physical interface 7. In some wireless embodiments, a power supply, one example being a battery, is provided within the decorative cover 8a, 8b and electrically coupled to components therein. In other wireless embodiments, no power supply is required as a passive antenna 91 and integrated circuit 10 are provided as shown in FIG. 11a.

The wireless interfaces 16, 17 could include devices which facilitate the functionality of a physical connector without direct contact between the interface elements. For example, wireless interfaces 16, 17 could include optical devices, examples including but not limited to IrDA elements, or RF (radio frequency) devices, examples including but not limited to Bluetooth, WiFi, passive RFID tag, Near Field Communication, non contact RF communication and the like, which enable unidirectional or bi-directional communication between a gift key 5 and a local system 1.

In some embodiments, the gift key 5 could further include a light 18 which extends from the decorative cover 8a, 8b through a like shaped opening formed by complimentary openings 59a, 59b. The light 18 could be electrically connected to components on the circuit board 9 so as to display the operational and/or power states of the integrated circuit 10. For example, the light 18 could be a light emitting diode, whereby the ON state of the gift key 5 is indicated when the light 18 is green, communication states between local system 1 and host system 3 or retailer systems 4a-4f are indicated when the light 18 is yellow, and/or a functional or power fault state is indicated when the light 18 is red. Other visual display queues are possible.

The gift key 5 could also include appendages 54a, 54b which replicate the arms, legs, and/or head of a character. Each appendage 54a, 54b could include a nub 55 and a channel 56, the latter secured between the paired arrangement of openings 57a, 57b, which compliment the shape of each channel 56 so as to fix the appendages 54a, 54b to the decorative cover 8a, 8b or allow the appendages 54a, 54b to move or rotate with respect to the decorative cover 8a, 8b.

In some embodiments, the physical interface 7 or wireless interface 16 could extend from the gift key 5 in a fixed arrangement through a like shaped opening formed by the paired arrangement of openings 58a, 58b. An optional cover 19, composed of a plastic cup-shaped element, could be used to cover the physical interface 7 or wireless interface 16 in a secured but removable fashion so as to prevent contaminants from damaging the interface.

In yet other embodiments, the gift key 5 could include elements which allow it to function as a key chain or facilitate attachment to a school bag, handbag, or other object. For example, the gift key 5 could include a loop 60 molded or attached to the decorative cover 8a, 8b. One end of a chain 13 could be secured to the loop 60 and the other end secured to a hook 12.

The gift key 5 could include an integrated circuit 10 with both internal masked ROM and flash EEPROM with built in USB controller. In one example, the integrated circuit 10 could be a universal serial bus microcontroller, model number EM78M612, sold by ELAN Microelectronics Corporation. The masked ROM could include twelve kilobytes of memory to store an operating system program. The operating system program could include a self-executable program automatically launched via an internet browser on a local system 1 when linked to a gift key 5. The program is intended to direct the local system 1 to a website controlled by a host system 3, as described herein. The operating system program could also include a security handshake algorithm which transfers an identifier or serial number unique to each gift key 5 so as to establish communication between a website at the host system 3 and a local system 1. Security protocols could prevent hackers from altering or otherwise bypassing the serial number electronically stored on the gift key 5, operating program, and/or website link. The masked ROM could also include a number of website addresses allowing one web address to be selected based upon the serial number stored on the EEPROM.

In some embodiments, the EEPROM could include four bytes to store a thirty-six digit individualized serial number. The serial number could be embedded with two digits which identify the web address of the retailer system 4a-4f stored on the masked ROM. This data could be stored on the internal memory of the EEPROM. In other embodiments, the EEPROM could be a separate device from the integrated circuit.

In some embodiments, the gift key 5 could include a micro-controller unit with internal EEPROM capable of storing a thirty digit GUID number, one example being model number SPCP18E2A sold by Sunplus Innovation Technology, Inc., a ROM element capable of storing an operating system and web link addresses, and a USB 1.1 or higher connector compatible with personal and Apple® computers and capable of communicating power to the micro-controller unit and other elements along the circuit board 9.

Executable programs on the integrated circuit 10 facilitate communication between a gift key 5 and host system 3. Communication between gift key 5 and host system 3 is authorized after a security handshake algorithm is properly executed, thereby allowing an interface between a website and a remotely located local system 1. The handshake program could be automatically launched and executed after a physical interface 7 on the gift key 5 is properly linked to a complimentary port 6 on a local system 1 or wireless interfaces 16, 17 are successfully linked. After the security handshake program is verified, the individualized serial number is transferred from the EEPROM memory to the host system 3.

Each EEPROM is programmed with at least one web address and a GUID number or the like, preferably thirty digits long; however, the number of digits is design and use dependent and may be longer or shorter. In some embodiments, the GUID number may not be the actual account number stored in the retailer's system so as to further enhance security. Non-correlated GUID numbers prevent the theft of account numbers because the latter is never passed from the gift key 5 to the host system 3 and/or retailer systems 4a-4f. Theft of a GUID number alone is not sufficient to access and redeem store credits at the host and retail levels.

Each integrated circuit 10 has an internal EEPROM that is unreadable by a hacker or the like. Since each EEPROM is internal to the integrated circuit 10 and not a separate component removable from the circuit board 9, the ROM operating system protects data in the EEPROM from being retrieved because an external lookup table is required to correctly map and retrieve the GUID number data.

When a gift key 5 is plugged into or otherwise linked to a local system 1 by a purchaser or recipient, the gift key 5 could automatically launch the web browser executable on the local system 1 and address an invisible form webpage residing on the host system 3 based on a web address stored on the gift key 5. The invisible webpage could have a thirty digit GUID number embedded and encrypted therein via a 128 bit header trigger template (HTTS). Every gift key 5 calls the same web link address, one example being www.3dgificard.com/register, and communicates its device specific GUID number to the site for identification and authentication purposes. In alternate embodiments, the actual account number could be stored on the EEPROM and passed to the host system 3 via the invisible webpage. This latter approach simplifies database and bar coding requirements at the host and retail levels.

In other embodiments, the GUID number is embedded into the web address stored on the gift key 5. When the gift key 5 automatically launches the web browser, the GUID number is encrypted inside the web address which then is passed to the host system 3 to specifically identify the gift key 5.

After receipt of the GUID number, the host system 3 decrypts the GUID number and correlates the GUID number to the account number and personal identification number (PIN) stored within a database or the like on the host system 3. Next, the host system 3 directs the web browser residing on the local system 1 to the correct webpage based on the card style and user. For example, the web browser could be directed to pages facilitating the customization of an electronic greeting card when the user is a purchaser and to pages which facilitate viewing of the greeting card and redemption of store credits when the user is a recipient. In some embodiments, the system and method described herein could assume a first use of the gift key 5 is by a purchaser and subsequent uses are by a recipient.

Digits within the GUID number are parsed to identify the style and number assigned to the gift key 5. For example, the first six digits in a thirty digit GUID number could correspond to the key style number and the last twenty-four digits to the key identifier number.

The key style number could correspond to the decorative theme appearing on the decorative cover 8a, 8b of the gift key 5, the retailer at which store credits are redeemable, or another classification system which logically links webpage content and design to the gift key 5 and/or its intended use. It is likewise possible for the key style to also identify the forwarding links to retailers which might appear on the host system 3 and retailer systems 4a-4f.

The key identifier number is a number assigned to each gift key 5 for identification purposes. The host system 3 processes the key identifier number to identify the account number for access to store credit data and PIN or security code for a specific retailer, as well as any customized electronic greeting card prepared specifically by a purchaser for a recipient. Accordingly, the key identifier number facilitates the automatic launch of the key specific greeting card when the gift key 5 is linked to a local system 1.

In preferred embodiments, the key identifier number should have sufficient digits to allow it to be processed as a credit card for non-restricted retailer applications. Presently, most credit cards require twenty-three digits to properly identify the account number (sixteen digits), expiration date (four digits), and PIN (three digits) for transaction purposes.

In some embodiments, it might be advantageous to print the GUID number onto the decorative cover 8a, 8b of the gift key 5 in a first bar code format. This bar code could be used to record the purchase of the gift key 5 by a purchaser at the retail level. This information could be communicated to the host system 3 so that subsequent use of the gift key 5 is permitted at the host and retail levels.

In yet other applications, a second bar code could be applied to the gift key 5 adjacent to the first bar code. This second identifier could be applied by an industry certified factory, separate and apart from the source of the first bar code, and used to identify the account number and optional PIN associated with the gift key 5. Two separately printed bar codes minimize potential security breaches otherwise possible when the same factory applies both bar codes. Correlation between account number/PIN and GUID number could be performed by scanning both numbers at the point-of-sale by a retailer to a purchaser or at a factory authorized to scan and correlate identifiers, which is thereafter communicated to the host system 3.

In other embodiments, a single bar code could be printed onto the gift key 5 so as to identify the account number and PIN only. The account number would be stored on the EEPROM within the gift key 5. This approach simplifies the bar code labeling process as only one bar code matching the device's EEPROM would be required.

Alternatively, a single bar code with account number and PIN could be printed onto the gift key 5 and the GUID number stored in the device's EEPROM. When the user connects to the host system 3, the GUID number is passed to the invisible webpage and the user is required to manually enter the account number and PIN displayed on the decorative cover 8a, 8b of the gift key 5 via a security login page displayed by the host system 3 or retailer systems 4a-4f. The login process could compare the GUID number and account numbers stored by the host system 3 to properly verify access to the host site.

Referring now to FIGS. 3a and 3b, the gift key 5 could include an interface 15 extendable from and retractable into the decorative cover 8a, 8b so as to protect the interface 15 and enhance the overall appearance of the gift key 5. The interface 15 could be a physical connector or wireless device, as described herein. The interface 15 would be disposed in a sliding fashion along cavity within the interior of the decorative cover 8a, 8b. The interface 15 could be attached to a button 14 likewise slidable along a slot 83, as represented in FIG. 3b. A user would extend the interface 15 in part or whole by sliding the button 14 in one direction along the slot 83 and retract the interface 15 in part or whole into the decorative cover 8a, 8b by sliding the button 14 in the opposite direction along the same slot 83. The button 14 could lock into one or more positions along the slot 83 to secure the interface 15 with respect to the decorative cover 8a, 8b.

Figure 4:
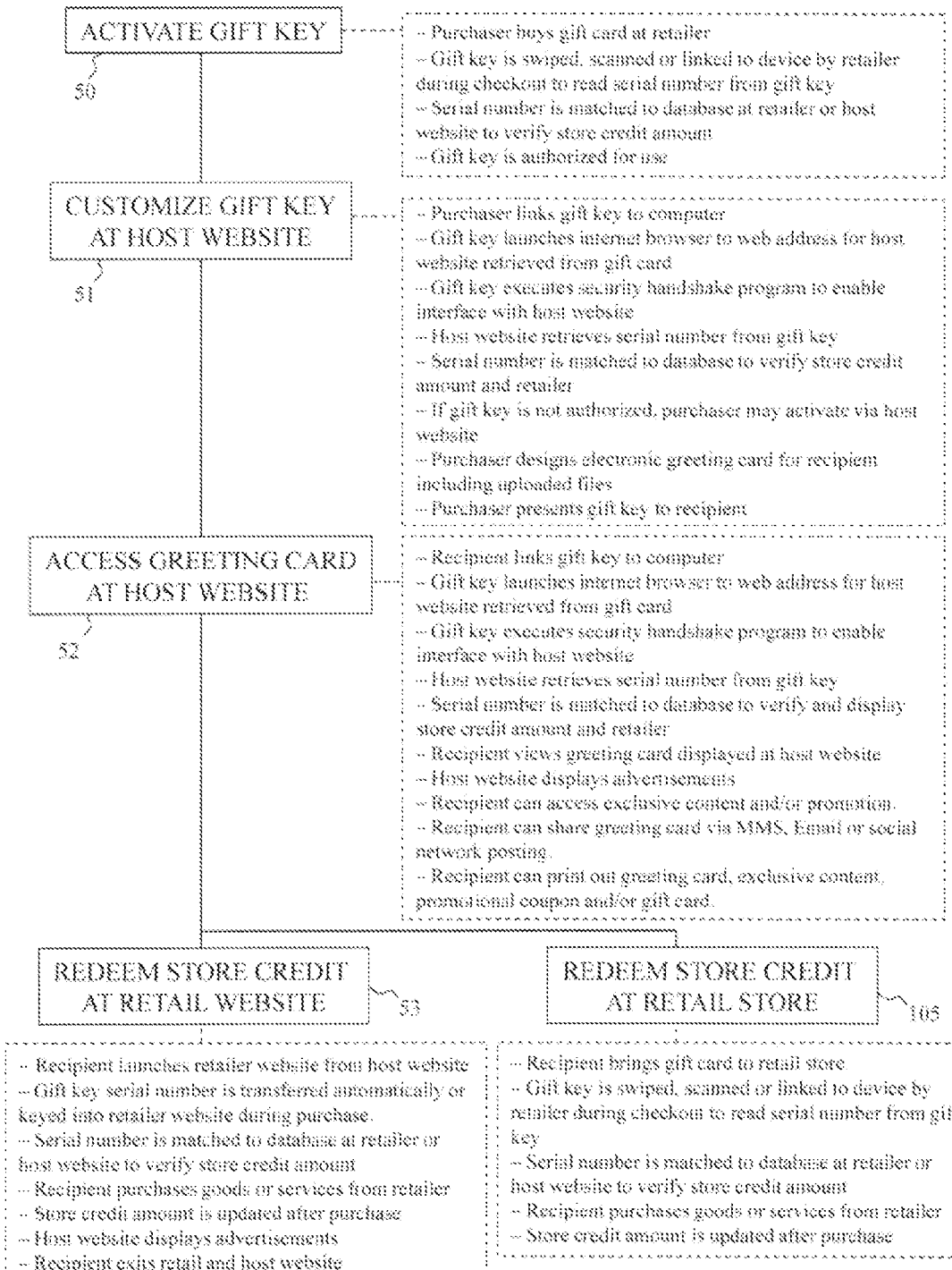
FIG. 4 is a flowchart illustrating transactional steps for viewing electronic greetings, redeeming store credit, obtaining promotions, and/or accessing exclusive content in accordance with an embodiment of the invention.

Referring now to FIG. 4, one exemplary embodiment of the method is described including the steps of activating a gift key 5, customizing a gift key 5 at a host website 51, accessing a greeting card at a host website 52, redeeming a store credit at a retail website 53 and redeeming a store credit at a retail store 105. The customizing and accessing steps are optional. Furthermore, one or both redemption methods could be accessible via the gift key 5.

The activation step 50 is performed when the gift key 5 is purchased at the point-of-sale by a purchaser from a retailer, online or telephonically. The activation step 50 could include a variety of sub-steps, non-limiting examples including: (1) purchaser buys a gift key 5 from retailer; (2) gift key 5 is swiped, scanned, or linked to device to read a magnetic strip or scanned to read a bar code on gift key 5 or packaging therefore, or linked, via the physical interface 7 or wireless connector 16, to a device, one example being a register, during checkout to read an identifier, examples being a serial, GUID or account number, specific to the gift key 5; (3) serial, GUID, or account number from the gift key 5 is cross referenced to database information at the point-of-sale or elsewhere to validate gift key 5, store credit amount, retailer for store credit, and other pertinent transactional information; and (4) gift key 5 is authorized for use at a host system 3. When the purchase is made remotely, the activation step is performed before shipment to the purchaser.

The customization step 51 is performed by the purchaser before the gift key 5 is delivered to a recipient. The customization step 51 could include a variety of sub-steps, non-limiting examples including: (1) purchaser links the gift key 5 via physical or wireless means to a local system 1; (2) gift key 5 automatically launches an internet browser to a web address retrieved from the gift card 5 for the website at the host system 3; (3) gift key 5 executes a security handshake program to enable interface with host website; (4) host website retrieves an identifier, examples being a serial, GUID, or account number, from the gift key 5 so as to properly identify the gift key 5; (5) identifier is cross referenced with database information to verify store credit amount and/or name of retailer; (6) purchaser could activate gift key 5 via host website when gift key 5 is not authorized in sub-step (5); (7) purchaser designs electronic greeting card for recipient which could include uploading image, video, data, and/or audio files embedded within the greeting card; and (8) purchaser presents gift key 5 to a recipient.

The access step 52 is performed by the recipient using a local system 1 which could be the same or different device used by the purchaser, as described herein. The access step 52 could include a variety of sub-steps, non-limiting examples including: (1) recipient links the gift key 5 via physical or wireless means to a local system 1; (2) gift key 5 automatically launches an internet browser to a web address retrieved from the gift key 5 for the host website displayed by the host system 3; (3) gift key 5 executes a security program to verify identity and enable communication with the host; (4) host website retrieves an identifier, examples being a serial, GUID, or account number, from the gift key 5 so as to properly identify the gift key 5; (5) identifier is cross referenced with database information to verify store credit amount and/or name of retailer; (6) recipient views optional greeting card, displayed by host website, associated with gift key 5 via the identifier; (7) host website could display advertisements specific to the identified retailer or other advertisers as a paid service; (8) recipient can access exclusive content and/or promotions, provided by host website, associated with gift key 5 via the identifier; (9) recipient can share optional greeting card using multimedia messaging service (MMS), email or social networking posting; and (10) recipient can print out optional greeting card, exclusive content, promotional coupon and/or gift card onto paper using standard computer printer.

The redemption step 53 is performed by the recipient using a local system 1 which may or may not be the device used by the purchaser, as described herein. The redemption step 53 could include a variety of sub-steps, non-limiting examples including: (1) recipient links gift key 5 via physical or wireless means to a local system 1 to automatically launch host or retailer website; (2) recipient launches retail website displayed by a retailer system 4a-4f corresponding to information retrieved from a gift key 5 by the host system 3; (3) recipient views and purchases goods and services from retailer via its retail website; (4) host website may display advertisements specific to identified retailer or content and theme specific media; and (5) recipient exits retail and/or host websites. Direct launch of a retailer website could require the execution of security protocols described herein to be performed at the retailer level.

The redemption step 105 is performed by the recipient to bring the gift key 5 or a printed copy of the gift card associated with said gift key 5 to the retail store. The redemption step 105 could include a variety of sub-steps, non-limiting examples including: (1) recipient brings gift key 5 to retail store; (2) gift key 5 is swiped to read magnetic strip or scanned to read a bar code on gift key 5 or printed out gift card therefore, or linked, via the physical interface 7 or wireless connector 16, to a device, one example being a register, during checkout to read an identifier, examples being a serial, GUID or account number, specific to the gift key 5; (3) serial, GUID, or account number from the gift key 5 is cross referenced to database information at the point-of-sale or elsewhere to validate gift key 5, store credit amount, retailer for store credit, and other pertinent transactional information; (4) recipient purchases goods and/or services from retailer at store; and (5) store credit amount assigned to serial, GUID or account number corresponding to the gift key 5 is updated after purchase.

The host website includes web pages enabling a purchaser to customize a greeting card and a recipient to view a customized greeting card and access one or more retailers. Web pages could include a variety of layouts and features. Webpages are written in one or more program languages understood in the art. Webpages are communicated to a local system 1 via the host system 3 over a network 2. In some embodiments, the design and content offering could depend on the design or theme of the gift key 5, as described herein.

FIGS. 5-8 describe several exemplary web pages used by a purchaser and recipient to access online features associated with the gift key 5. Other designs, layouts, and options are possible, including access to theme specific content including, but not limited to games, media, online resources, movie related content, cause or organization related content, advertising or marketing materials, or any informational content which could be associated with a gift key 5 which is displayable or communicable to a user. Web pages described in FIGS. 5-8 provide for one possible embodiment of the content accessible with a gift key 5. Web pages are not meant to be exhaustive of the appearance and functionality of the described invention, but rather are merely illustrative to assist in describing aspects of the online content and its function in the manner described herein.

Figure 5:
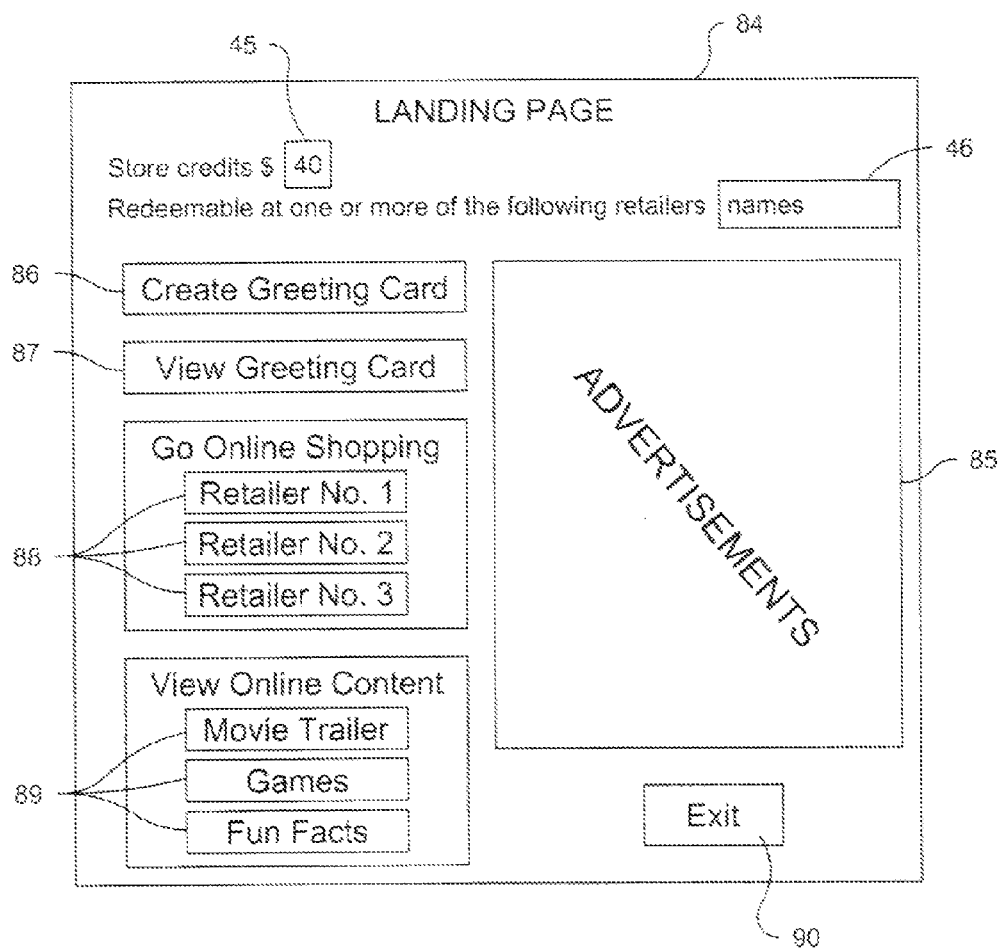
FIG. 5 is an exemplary webpage displayed by a host site used by a purchaser or a recipient to access online features via the gift key and website in accordance with an embodiment of the invention.

Referring now to FIG. 5, an exemplary landing webpage 84 is shown including a variety of frames, fields, and buttons. The landing webpage 84 is an optional page displayed on a local system 1 via a host system 3 after linkage of a gift key 5 to a local system 1 and a security algorithm is properly completed. In some embodiments, the landing webpage 84 could be a single page with features pertinent to a purchaser and recipient. In other embodiments, the landing webpage 84 could be two pages separately showing features pertinent to a purchaser and a recipient. In preferred embodiments, the landing webpage 84 includes designs and features which are theme specific and/or correspond to the decorative appearance of the gift key 5. For example, a gift key 5 having the appearance of an action figure could access a landing page 84 with an advertisement frame 85 which displays goods and/or services corresponding to the action figure. The advertisement frame 85 could display a video, play an audio message, or communicate interactively with the viewer via known formats and protocols. In some embodiments, the advertisement frame 85 could include two or more separate frames which appear at various locations along the landing webpage 84. In other embodiments, the advertisement frame 85 could appear as the background in a webpage or in the foreground as a pop-up screen. In yet other embodiments, one or more additional advertisement frames 85 could appear on the web pages shown in FIGS. 6-8. An EXIT button 90 is provided to close the link between local system 1 and host system 3 and all advertisement frames 85, so as to redirect the web browser on the local system 1 to its default page.

The gift value field 45 and retailer field 46 display information specific to the gift key 5 relevant to store credits data stored at the host system 3. The retailer field 46 could include one or more names. When the gift key 5 is redeemable at any retailer, the retailer field 46 could include one or more suggested retailers to focus and direct purchases by the recipient.

Figure 6:
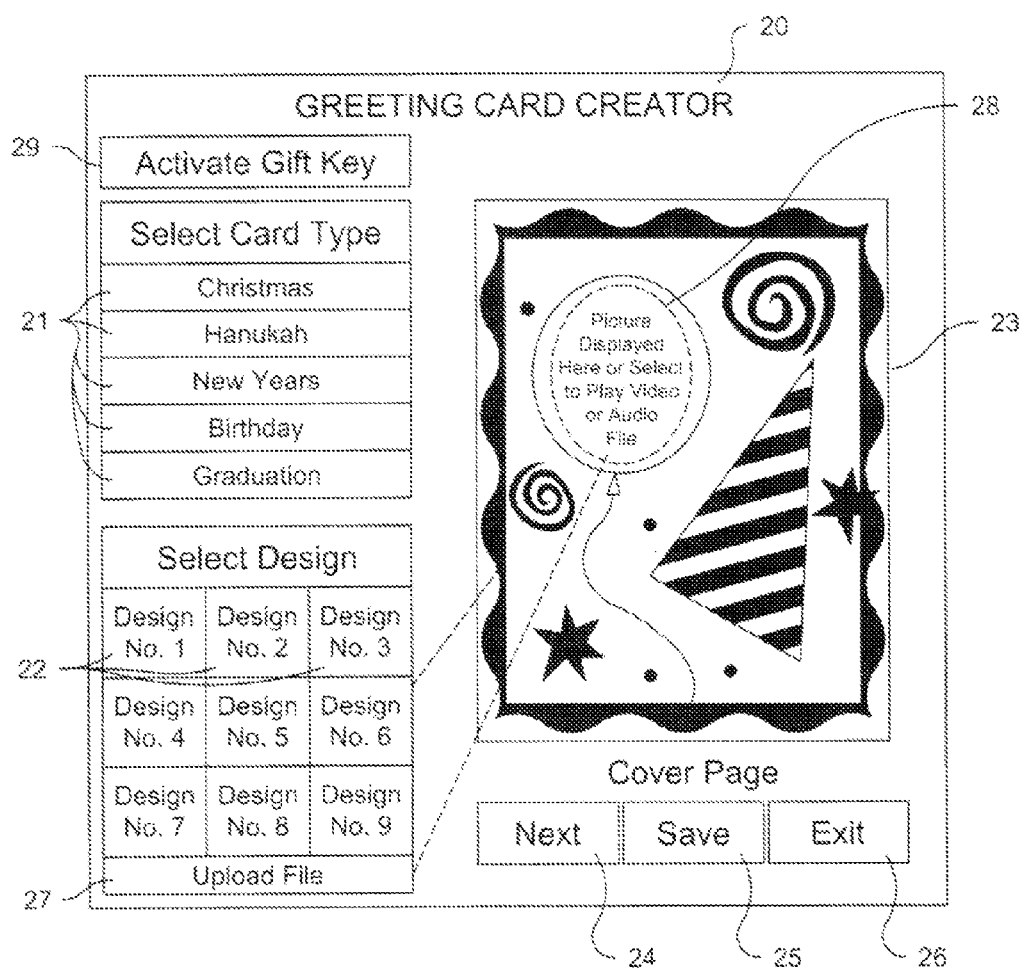
FIG. 6 is an exemplary webpage displayed by a host site used by a purchaser to customize a cover page of an electronic greeting card associated with a gift key in accordance with an embodiment of the invention.
Figure 7:
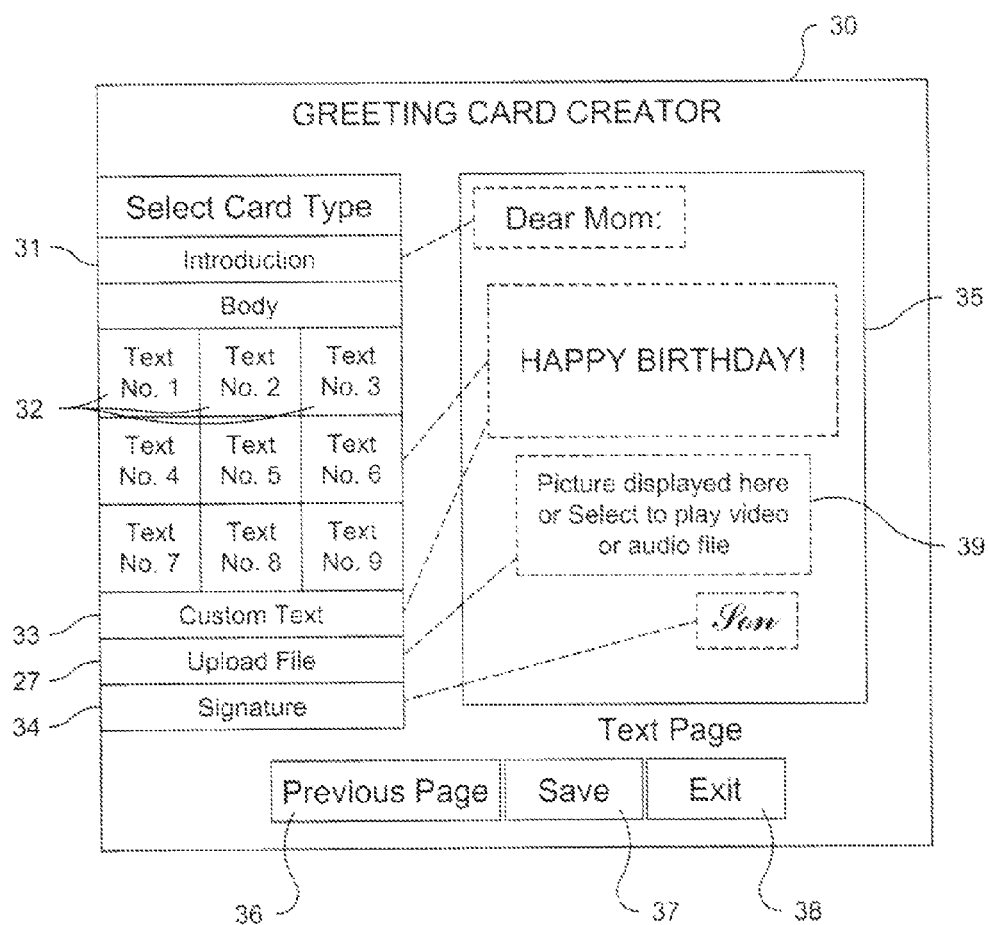
FIG. 7 is an exemplary webpage displayed by a host site used by a purchaser to customize a text page of an electronic greeting card associated with a gift key in accordance with an embodiment of the invention.

The CREATE CARD button 86 accesses the web pages shown in FIGS. 6 and 7, as described herein. The CREATE CARD button 86 could be disabled after it is first selected by a purchaser to prevent subsequent access by a recipient or reuse by a subsequent party. In some embodiments, the remaining buttons could be disabled to prevent access to these features by a purchaser, but otherwise selectable after subsequent connections.

Figure 8:
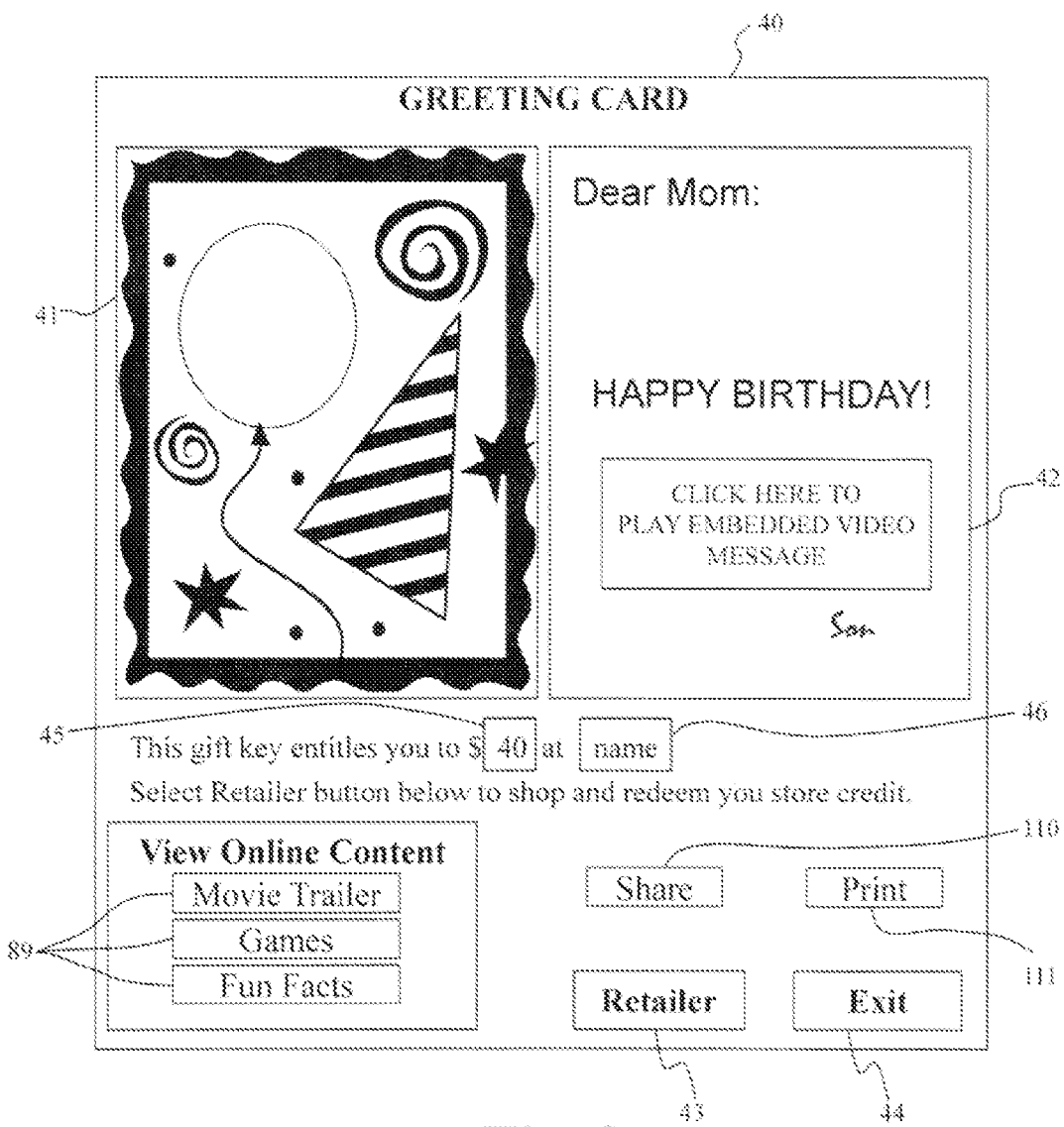
FIG. 8 is an exemplary greeting card with link to a retailer, for purpose of redeeming store credits, displayed by a host site to the recipient of a gift key in accordance with an embodiment of the invention.

The VIEW CARD button 87 accesses and displays the webpage shown in FIG. 8, as described herein. The VIEW CARD button 87 could be accessible by either a purchaser to preview a greeting card or a recipient to view a greeting card prepared by a purchaser.

One or more ONLINE SHOPPING buttons 88 access web pages at the host system 3 or provides a hyperlink to web pages viewable from a retailer system 4*a*-4*f* so as to facilitate online shopping by a recipient. The recipient then browses the web pages selecting items for purchase which are paid for with store credits associated with the gift key 5. When shopping is performed at the retailer level, the host system 3 could transmit the value of store credits available, account number and PIN, and other transactional information to the retailer system 4*a*-4*f* to facilitate completion of a purchase transaction via processes employed by the retailer, after which the retailer communicates the total value of store credits used or remaining to the host system 3 so that the host system 3 is able to properly update its database information for the gift key 5.

One or more ONLINE CONTENT buttons 89 access online content from the host system 3, retailer system 4*a*-4*f*, or other third party website, which could correspond to the decorative design or theme of the gift key 5. In several examples, the ONLINE CONTENT button 89 could display a movie trailer in a popup screen, allow the recipient to access an online game, or allow the recipient to view information. Online content could be provided by the host system 3, a retailer system 4*a*-4*f*, or by a third party. The ONLINE CONTENT button 89 could include a "straight link" to a specific web address readable by a recipient or an "encrypted web link" whereby the web address is scripted so as to prevent a recipient from directly accessing the content without the gift key 5.

The recipient could customize an electronic greeting card linked to the gift key 5 via the serial or GUID number. This identifier is cross referenced at the host system 3 to identify the file or database location to display a greeting card whenever a purchaser creates or a recipient retrieves a card.

In some embodiments, the electronic greeting card could be a Flash-based webpage. The greeting card is created and customized to include text, graphics, images, video, and/or audio. Text message boxes could include user drafted text fields positioned anywhere within the active area of a webpage and adjustable with respective to the style, color and size of fonts. Graphics and images in a variety of formats, examples including but not limited to JPEG and BMP, may be uploaded from a local system 1 to a host system 3, resized, and positioned anywhere within the active area of a webpage. Exemplary images could include clip art, backgrounds, and border. Video files in a variety of formats, examples including but not limited to MPEG and AVI, may also be uploaded into the active area of a webpage and resized. Audio files in a variety of formats, one example being MP3, may also be updated into the active area of a webpage and queued to play when selected. Audio files may be created by the purchaser via known methods. In preferred embodiments, an electronic greeting card is created and customized by a purchaser using text, image, video, and/or audio templates.

Referring now to FIG. 6, a card creator webpage 20 is shown for the cover page displayed when the gift key 5 is first attached to a local system 1 or accessed via a landing webpage 84. A preview window 23 displays the cover page in real time as the purchaser selects designs and uploads files for display on the card. In this embodiment, the webpage 20 includes several CARD TYPES buttons 21 below the Select Card Type identifier which correspond to holidays, events, and celebrations for which a gift is appropriate. The purchaser selects the appropriate card type by placing a cursor over the button corresponding to the appropriate event and clicking a button on a mouse communicating with the local system 1. Selection of the card type causes the DESIGN buttons 22 below the Select Design identifier to be updated to display a design associated with each button in miniature. The purchaser selects a design by placing the cursor over a DESIGN button 22 and clicking a button on the mouse, after which the design is displayed within the preview window 23.

Some designs may include an upload frame 28 to display a picture or video or play an audio message for the recipient. A file is uploaded from the local system 1 to the host system 3 by placing the page cursor over the UPLOAD FILE button 27 and clicking a button on the mouse. A popup window is displayed to allow input of the name and location of the file on the local system 1 which corresponds to the image, video, or audio file. The file is transferred via protocols understood in the art from the local system 1 to the host system 3. Thereafter, the upload frame 28 is updated to show the picture or first image of the video or display a decorative image corresponding to an audio file. The cover page design is saved to a file located on the host system 3 by clicking the SAVE button 25. Alternatively, the purchaser may select the EXIT button 26 to exit to the host website without saving the card design.

An ACTIVATION button 29 could be included in some embodiments to allow the purchaser to activate the gift key 5. The ACTIVATION button 29 causes sub-steps (3) and (4) to be performed from the activation step 50, as described herein.

A NEXT button 24 is provided to allow the purchaser to display the webpage in FIG. 7. Referring now to FIG. 7, a webpage 30 is shown for the text page which is displayed when the gift key 5 is first attached to a local system 1. A preview window 35 displays the text page in real time as the purchaser selects an introduction, text, and signature and uploads files for display on the card. The purchaser inputs the introduction by selecting the INTRODUCTION button 31 and typing the desired text in the corresponding field within the preview window 35. In this embodiment, the webpage 30 includes TEXT buttons 32 below the Body identifier which correspond to pre-prepared messages consistent with the card type. The purchaser selects the appropriate text message by clicking a TEXT button 32, after which the selected text message is displayed within the preview window 35. A CUSTOM TEXT button 33 is also provided so as to allow the purchaser to compose a message for display in the corresponding field within the preview window 35. The purchaser inputs a signature by selecting the SIGNATURE button 34 and typing the desired text in the corresponding field within the preview window 35.

Some designs could include a display frame 39 to display a picture or video or play an audio message for the recipient. A file is uploaded from the local system 1 to the host system 3 by placing the page cursor over the UPLOAD FILE button 27 and clicking a button on a mouse. A popup window is displayed to allow input of the file name and its location on the local system 1 which corresponds to the file containing the image, video, or audio content. The file is transferred via protocols understood in the art from the local system 1 to the host system 3. Thereafter, the display frame 39 is updated to show the picture or first image of the video or display a decorative image corresponding to an audio file. The text page design is saved to a file or database located on the host system 3 by clicking the SAVE button 37. Alternatively, the purchaser may select the EXIT button 38 to exit to the host website without saving the card design. A PREVIOUS PAGE button 36 is provided to allow the purchaser to return to the webpage shown in FIG. 6.

Referring now to FIG. 8, a greeting card webpage 40 is shown when the gift key 5 is first attached to a local system 1 or accessed via a landing webpage 84 by a recipient. The greeting card webpage 40 includes a cover page frame 41 and text page frame 42 which display the pages customized by the purchaser, as previously described in FIGS. 6 and 7. The text page frame 42 is shown including an embedded video message which is accessed by placing the cursor within the field and selecting the field via a mouse button.

A gift value field 45 and retailer field 46 are provided for informational purposes. The gift value field 45 displays the present value of a store credit available at the retailer named in the retailer field 46. A SHARE button 110 is provided to allow the recipient to electronically send the greeting card using a multimedia messaging service (MMS), email, social networking posting, or other electronic communication means understood in the art. Communication of the greeting card is via methods and protocols understood in the art. A PRINT button 111 is provided to allow recipient to make either a hard or electronic copy of the electronic greeting card, exclusive content, promotional coupon and/or gift card or other online content via a printer or other peripheral device or storage device in communication with a local system 1. A RETAILER button 43 is provided to allow the recipient to launch the retail website associated with the gift key 5. An EXIT button 44 is provided to allow the recipient to exit the host website and return the web browser on the local system 1 to its default page.

In some embodiments, one or more ONLINE CONTENT buttons 89, as described herein, access online content from the host system 3, retailer system 4a-4f, or other third party website, which correspond to the decorative design or theme of the gift key 5.

The redemption of store credits could be processed via third party companies or the retailer directly via a secure connection between local system 1 with gift key 5 and host system 3 or retailer system 4a-4f. The methods and systems described herein are compatible with both externally and internally processed transactions.

Third party processing could include the steps of: (1) assigning an account number and PIN to each gift key 5 so as to avoid duplicate and conflicting identifiers; (2) barcoding each gift key 5; (3) storing store credit information in a database accessible by the thirty party via a reference system which allows for tracking and accounting for each gift key 5; and (4) interfacing with the retailer's management information system to retrieve transaction data and adjust the store credits available on a gift key 5. During a transaction, the gift key 5 communicates its GUID number to the host system 3 which is cross referenced by the host system 3. A portal is established to communicate with a third party to verify the account number and PIN for the gift key 5.

Internal or retailer processed transactions could include the steps of: (1) assigning an account number and PIN to each gift key 5 so as to avoid duplicate and conflicting identifiers; (2) bar coding each gift key 5 by a certified factory; (3) storing store credit information in a database, managed by the retailer, via a reference system which allows for tracking and accounting for each gift key 5; and (4) interfacing with the retailer's database to retrieve transaction data and adjust the store credits available on a gift card 5. During a transaction, the gift key 5 communicates its GUID number to the host system 3 which is cross referenced by the host system 3. A portal is established to communicate with a retailer to verify the account number and PIN for the gift key 5.

Figure 9:
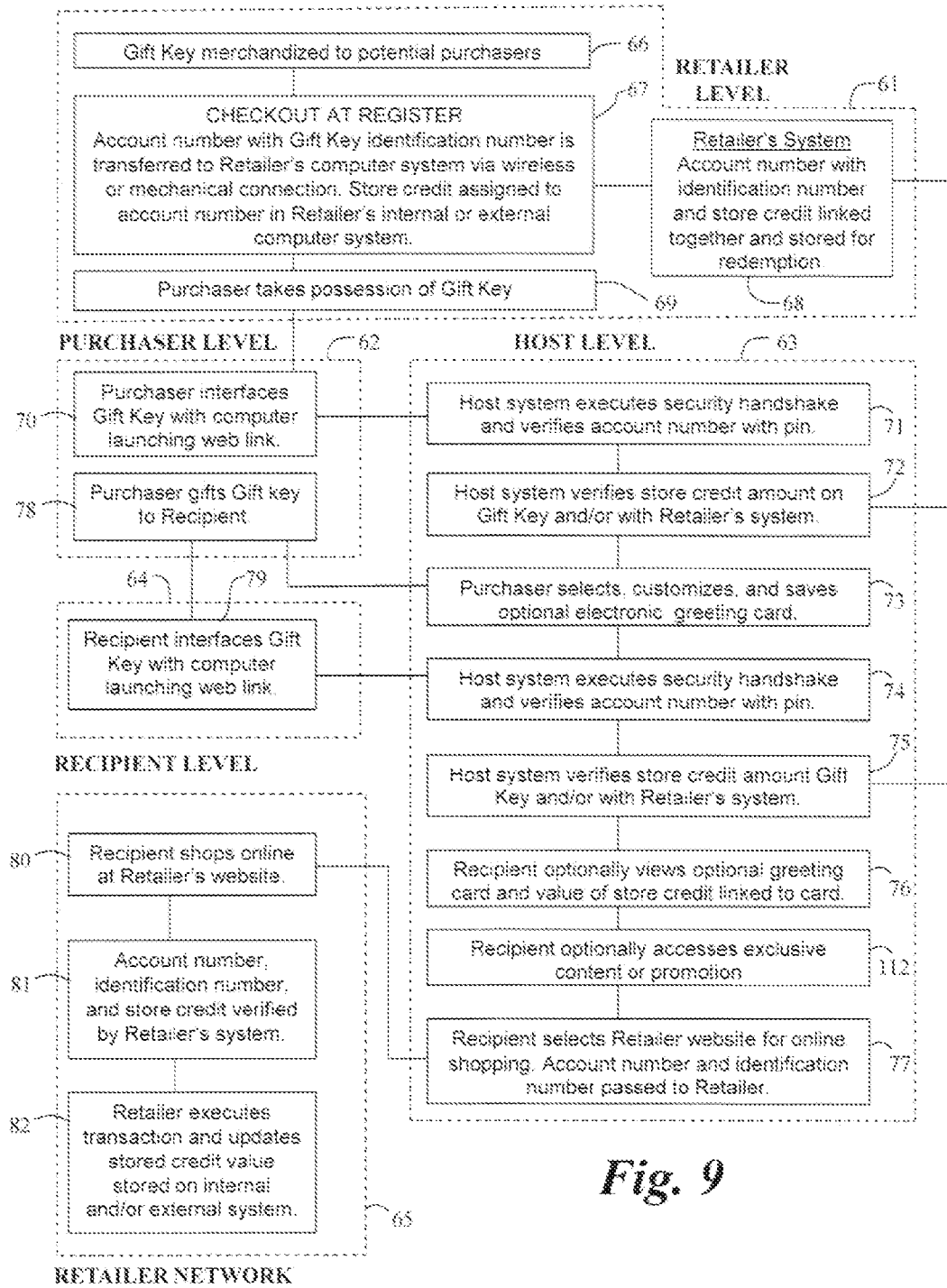
FIG. 9 is a flowchart illustrating interactions between retailer, purchaser, recipient, host, and network levels for viewing electronic greetings, redeeming store credit, obtaining promotions, and/or accessing exclusive content in accordance with an embodiment of the invention.

Referring now to FIG. 9, a flowchart is provided for one possible embodiment of system and method for a gift key 5 implemented transaction. The flowchart is not meant to be exhaustive, but rather is merely illustrative to assist in describing aspects of a transaction in the manner described herein.

Steps 66-69 are performed at the retailer level 61 and include both traditional in-store and electronically-based, on-line events. In step 66, the gift key is merchandized to prospective purchasers at retail locations for purchase. In step 67, the purchaser has selected the gift key 5 for purchase at a retail location, online, or telephonically and pays for the device. When the purchase is made remotely, the activation step is performed before shipment of the purchaser. The gift key 5 is scanned to record one or more bar codes which appear on the device or packaging therefore. The store credit assigned to the gift key 5 is assigned to an account number for tracking purposes either external or internal to the retailer. In step 68, account number and store credit are cross referenced for later retrieval. In step 69, the purchaser takes possession and ownership of the gift key 5.

Steps 70 and 78 are performed at the purchaser level 62 and include physical events by the purchaser and intermediate or electronically implemented events, namely, steps 71-73, at the host level 63. In step 70, the purchaser either physically or wirelessly connects the gift key 5 to a local system 1. The gift key 5 automatically launches a webpage originating at the host level 63 and viewable at the purchaser level 62. In step 71, the host system 3 executes a security program to verify identifiers passed from the gift key 5 to the host. If identifiers fail verification, access is denied. Otherwise, in step 72 the host system 3 will verify the store credit value available with the gift key 5 at the host level 63 and/or the retailer level 61 and could display FIG. 5. In step 73, the purchaser customizes and saves an electronic greeting card at the host level 63 and viewable at the purchaser level 62 via the web pages described in FIGS. 6 and 7. In step 78, the purchaser physically transfers possession and ownership of the gift key 5 to a recipient.

Step 79 is performed at the recipient level 64 including a physical event by the recipient and electronically implemented events, namely, steps 74-77, at the host level 63. In step 79, the recipient either physically or wirelessly connects the gift key 5 to a local system 1. The gift key 5 automatically launches a webpage originating at a host level 63 and viewable at the recipient level 64. In step 74, the host system 3 executes a security program to verify identifiers passed from the gift key 5 to the host. If identifiers fail verification, access is denied. Otherwise, in step 75 the host system 3 will verify the store credit value available with the gift key 5 at the host level 63 and/or the retailer level 61 and could display FIG. 5. In step 76, the recipient could view the electronic greeting card stored at the host level 63 and viewable at the recipient level 64 via the webpage described in FIG. 8. In step 112, recipient could access exclusive content or promotions stored at the host level 63 and viewable at the recipient level 64 via webpage described in FIG. 8. Exclusive content could include, but is not limited to, video, game, picture, music, story, descriptive materials, or other works. Promotions could include an option, right, privilege, or license to purchase, receive, and/or use goods, products or services at a predetermined price or at no cost. Promotions could be redeemed at a retail store or online. Exclusive content or promotion could be accessed from the host system 3, retailer system 4a-4f, or other third party website. In step 77, the recipient selects a retail site for online shopping and identifier information is transferred to the retailer network 65.

Steps 80-82 are performed at the retailer network 65 and include electronically-based, on-line events. In step 80, the recipient shops online by viewing web pages at the retailer network 65 and viewable at the recipient level 64. In step 81, the retailer network 65 verifies account and credit information via a cross reference to a key specific database. If identifiers fail verification, then access is denied. Otherwise, the user is permitted to view retailer's web pages. In step 82, the recipient has chosen goods or services for purchase and executes an online process specific to the retailer during which store credits are depleted from the gift key 5 and the recipient takes ownership of the goods and/or services. Steps 79, 74-77, and 80-82 are repeatable, if store credits remain on the gift key 5 after each transaction by the recipient.

A variety of other embodiments are possible for the gift key 5 and system and method therefore, as described herein. The description above is likewise applicable, in part or whole, to the embodiments described below. For example, the physical interface 7 above could be substituted for the antenna 91 described below. In another example, the description below is applicable, in part or whole, to the gift key 5 described in FIGS. 2, 3a, and 3b.

Figure 10:
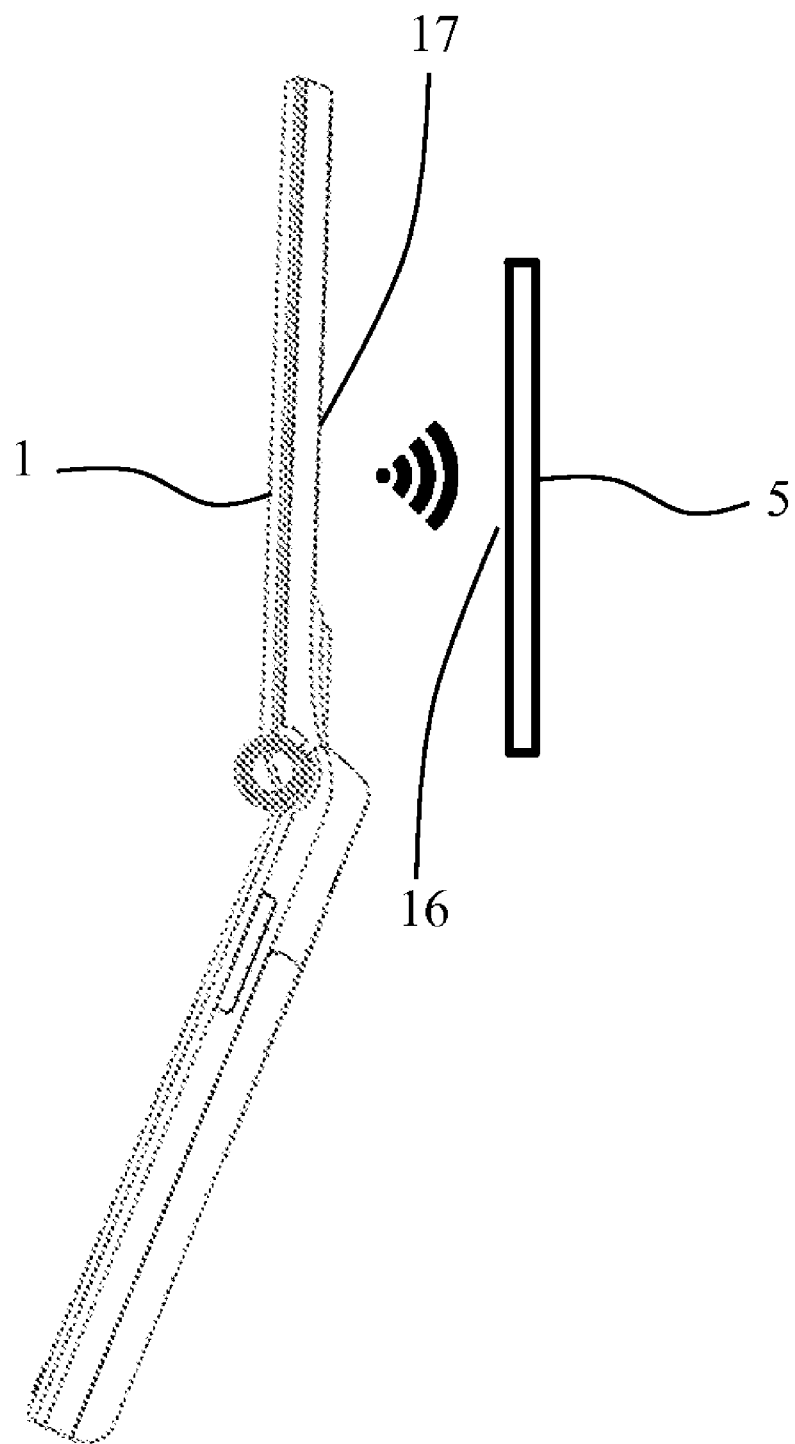
FIG. 10 is a schematic diagram illustrating interaction between a gift key wirelessly linkable to a local system, specifically a smartphone, in accordance with an embodiment of the invention.

Referring now to FIG. 10, the gift key 5 could include a wireless interface 16 which communicates with a complimentary wireless interface 17 residing on a local system 1 in the form of a wireless telephone. The local system 1 could also be a personal computer, laptop computer, handheld computer, mobile phone, smartphone, tablet computer, Smart TV system or other similar device that is wirelessly enabled. The local system 1 could automatically sense or activate and communicate with or to the gift key 5 so as to initiate communication with a host system 3, retailer system 4a-4f, or other remote system. In other embodiments, the local system 1 might require a user to initiate communication with the gift key 5 via an app residing on the local system 1.

Referring now to FIG. 11a, the gift key 5 could include an antenna 91 disposed on a decorative cover 8a. The decorative cover 8a could be a planar disposed substrate which is flexible, semi-rigid, or rigid and which minimizes degradation to or interference with transmissions to and from the antenna 91. The antenna 91 could communicate with an integrated circuit 10 enabling the functionality described herein. The antenna 91 could be silk screen printed onto one surface of the decorative cover 8a. The antenna 91 could be flexible, semi-rigid, or rigid. The integrated circuit 10 could be mechanically or adhesively mounted to the surface of the decorative cover 8a and physically connected to the antenna 91. In some embodiments, it might be desirous to enclose the antenna 91 and integrated circuit 10 between a pair of decorative covers 8a, 8b. In preferred embodiments, the integrated circuit 10 could include a micro-controller unit that is Near Field Communication enabled with an internal EEPROM capable of storing an encrypted GUID number and weblink, examples including, but not limited to, NXP MIFARE Ultralight C, NXP DESFire, NXP MIFARE Classic, Innovision Topaz, and Sony FeliCA.

Figure 11B:
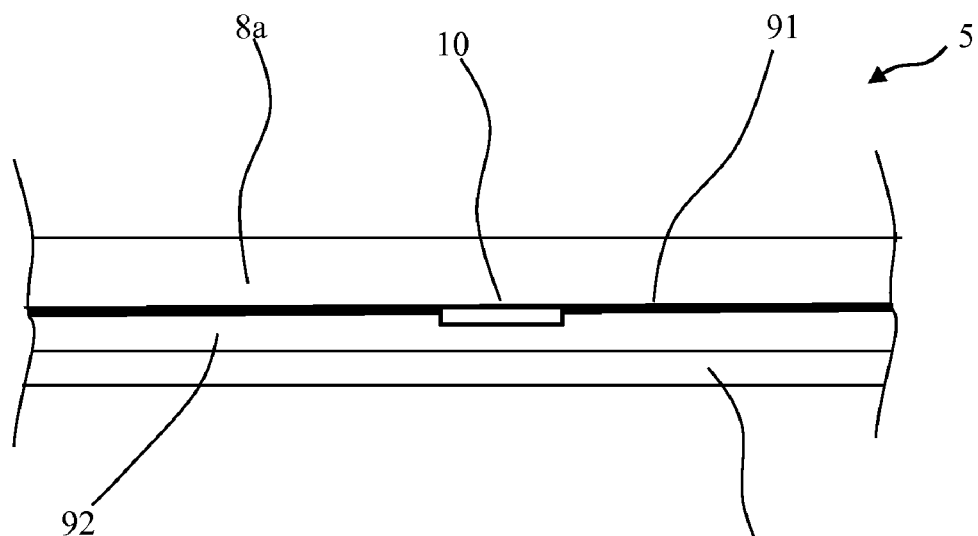
FIG. 11b is a cross section view showing a wireless gift key configured as a sticker with peel-off backing in accordance with an embodiment of the invention.
Figure 11C:
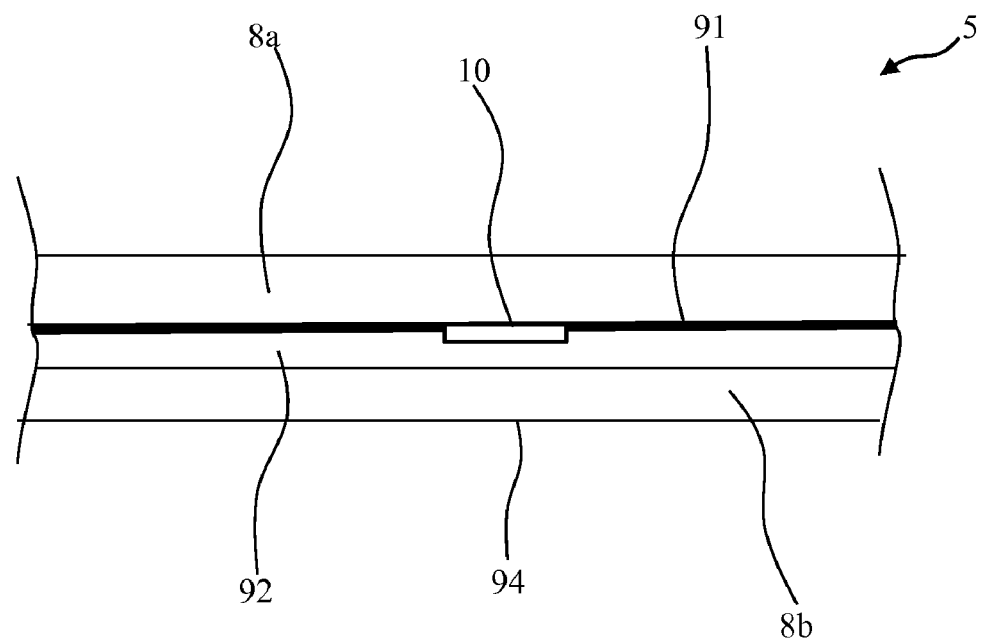
FIG. 11c is an alternate embodiment of the gift key from FIG. 11b wherein the backing layer includes indicia.

Referring now to FIG. 11b, the gift key 5 is shown including an antenna 91 and integrated circuit 10 disposed along one side of a decorative cover 8a. An adhesive layer 92 is disposed along the surface of the decorative cover 8a so as to cover and enclose the antenna 91 and integrated circuit 10 along the surface of the decorative cover 8a. The adhesive layer 92 could be a composition which adheres or sticks to one or more materials including, but not limited to, wood, plastic, metal, cardboard, fabric, ribbon, and paper. A backing layer 93 could be applied to the exposed surface of the adhesive layer 92 opposite of the decorative cover 8a. The backing layer 93 could be a plastic or paper composition which adheres and sticks to the adhesive layer 93, yet readily removable therefrom. The backing layer 93 shields the adhesive layer 93 from contaminants which could degrade the properties and/or performance of the adhesive and further prevents inadvertent attachment of the gift key 5 prior to use. In some embodiments, it might be desirous to include indicia 94 along an exterior surface of the backing layer 93 as represented in FIG. 11c. Indicia 94 could include instructional information pertaining to use of the gift key 5, advertisements, information pertaining to the gift key 5, or decorative designs. In some embodiments, the indicia 94 could indicate the location of the wireless interface 16 within the gift key 5 so that a user may properly position the gift key 5 with respect to another wireless interface 17 for communication purposes. In preferred embodiments, the gift key 5 would be flexible so as to function as a sticker so that the gift key 5 readily conforms to a mounting surface.

Figure 12:
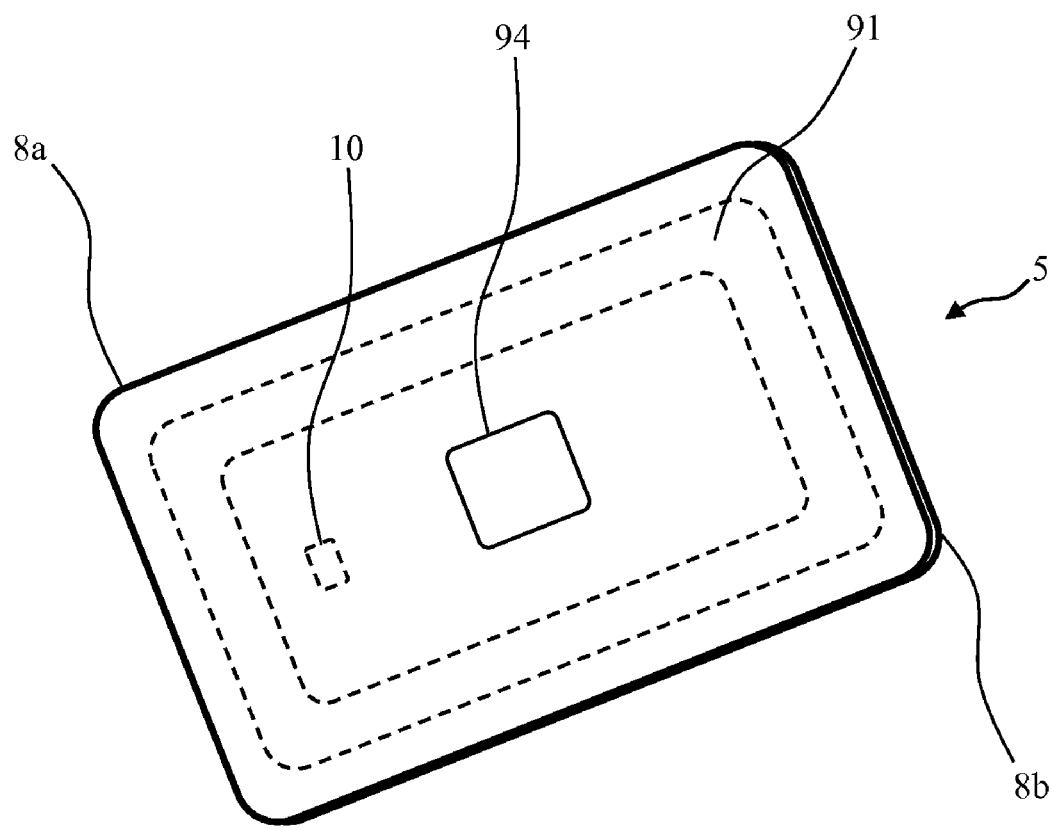
FIG. 12 is a front perspective view showing a gift key configured as a wallet-size card in accordance with an embodiment of the invention.

Referring now to FIG. 12, the antenna 91 and integrated circuit 10 are shown disposed between and enclosed between a pair of decorative cover 8a, 8b. In these embodiments, the decorative covers 8a, 8b could be rigid or semi-rigid so that the gift key 5 has the appearance of a wallet-size card. The gift key 5 could include indicia 94, non-limiting examples being a greeting, note, signature, or other text or design. In some embodiments, the indicia 94 could indicate the location of the wireless interface 16 within the gift key 5 so that a user may properly position the gift key 5 with respect to another wireless interface 17 for communication purposes. The indicia 94 could be clearly visible after attachment to the decorative cover 8a, 8b or through an opening along a decorative cover 8a, 8b. In other embodiments, the indicia 94 could be disposed along an exterior surface of the decorative cover a, 8b.

In some embodiments, a gift key 5 could communicate via either NFC or non-contact RF enabled methods and protocols during retail checkout with a register terminal within a store to pass an account number unique to the gift key 5 so as to redeem a store credit. In other embodiments, the gift key 5 could transmit a web address and an encrypted account number to a register terminal which is then communicated to a retailer system and thereafter passed to a host site which deciphers the account number associated with the gift key 5. At the host site, a redeemable value corresponding to the deciphered account number could be transmitted back to the retailer system allowing the transaction to be completed and store credit redeemed. In yet other embodiments, a retail terminal could perform a secondary NFC data exchange protocol with the gift key 5 that retrieves only an account number which is then transmitted to a retailer system. In this latter embodiment, other local computers 1 that communicate with the gift key 5 would receive the primary NFC data exchange whereby a web address and an encrypted account number is transmitted. In yet other embodiments, a user could redeem a store credit via a gift key 5 after entering or providing a security code, one non-limiting example being a personal identification number (PIN), prior to completion of a transaction. The PIN could be established by either a purchaser or a recipient or preprogrammed into the gift key 5 during manufacture.

Figure 13:
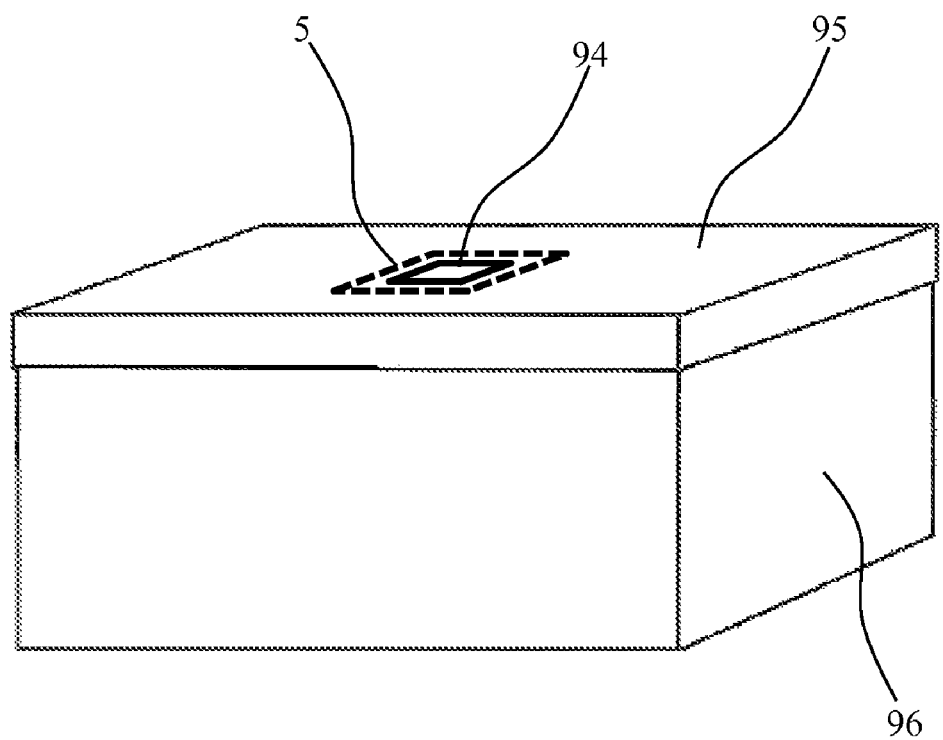
FIG. 13 is a front side perspective view showing a gift key attached to a gift box in accordance with an embodiment of the invention.

Referring now to FIG. 13, the gift key 5 is shown attached to a box top 95 of a box. The box could be a gift box, container with or without lid, or closable container capable of partially or completely surrounding and holding an item. In these embodiments, the gift key 5 could be embedded within a wall along the box top 95 as similarly described for the embedded embodiment in FIG. 12, whereby the structure of the box top 95 functions as the decorative covers 8a, 8b. In other embodiments, the gift key 5 could be adhesively bonded to the interior or exterior of the box top 95 via an embodiment of the gift key 5 otherwise described in FIGS. 11b and 11c. In yet other embodiments, the gift key 5 could be integrated within or onto a gift wrapping about the box via configurations described herein. In some embodiments, the gift wrap could form the decorative cover 8a. In yet other embodiments, the gift key 5 could be disposed along the surface of a box so that the box structure is the decorative cover 8a. The gift key 5 could include indicia 94, non-limiting examples being a greeting, note, signature, or other text or design. In some embodiments, the indicia 94 could indicate the location of the wireless interface 16 within the gift key 5 so that a user may properly position the gift key 5 with respect to another wireless interface 17 for communication purposes. The indicia 94 could be clearly visible after attachment to the box or through an opening along the box. It is important to note that the gift key 5 could be placed along any surface of the box structure including a side 96 or bottom opposite the box top 95. It is understood that alternate embodiments of the gift key 5 could include a physical interface 7 rather than an antenna 91.

Figure 14:
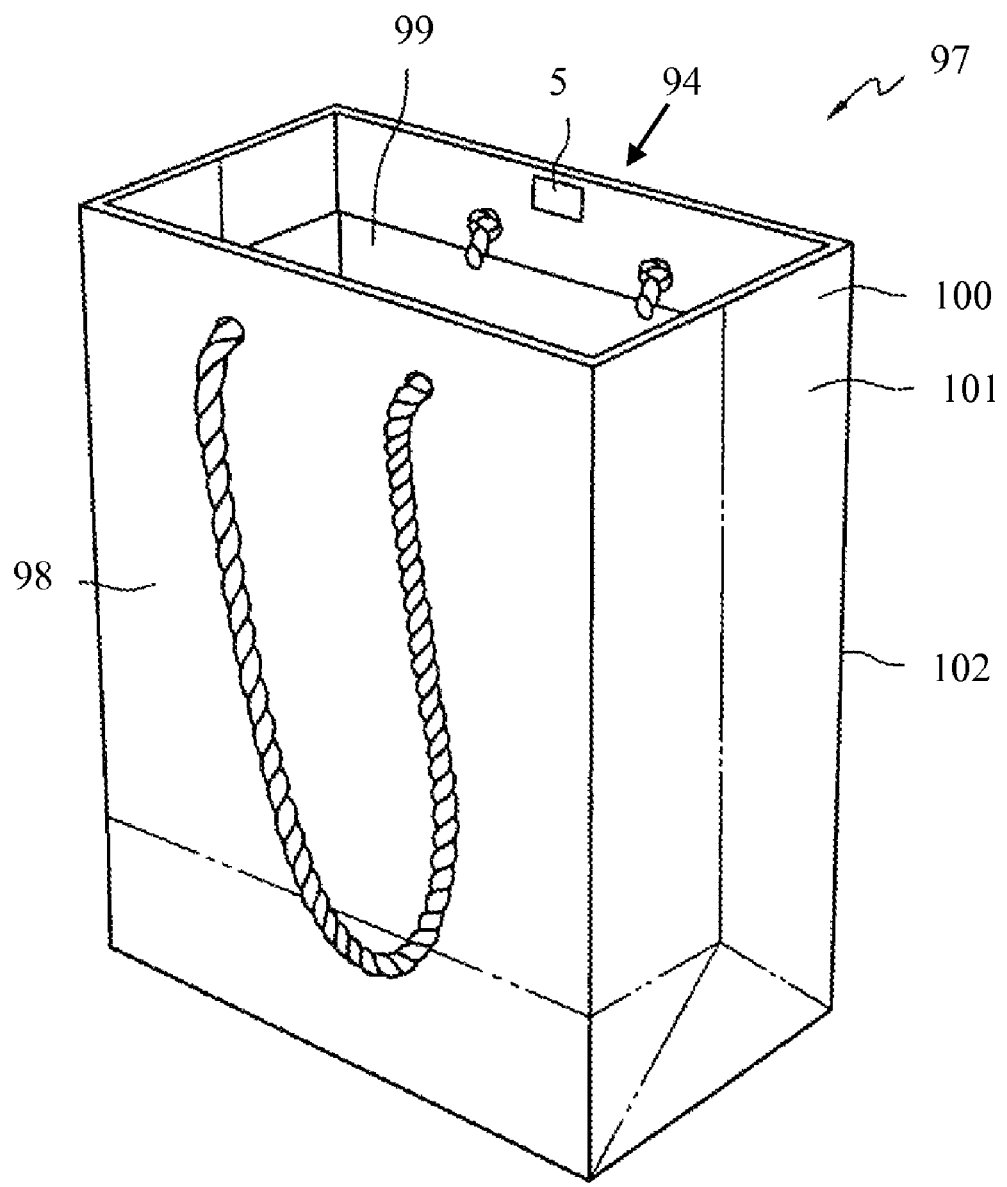
FIG. 14 is a front side perspective view showing a gift key attached to a gift bag in accordance with an embodiment of the invention.

Referring now to FIG. 14, the gift key 5 is shown attached to a bag 97 with a pair of handles 98, one non-limiting example being a gift bag. In these embodiments, the gift key 5 could be embedded within a wall of the gift bag 97 as similarly described for the embedded embodiment in FIG. 12, whereby the structure of the bag 97 functions as the decorative covers 8a, 8b. In other embodiments, the gift key 5 could be adhesively bonded to an interior surface 99 or an exterior surface 100 via an embodiment of the gift key 5 otherwise described in FIGS. 11b and 11c. In yet other embodiments, the gift key 5 could be disposed along the surface a bag 97 so that the bag structure is the decorative cover 8a. The gift key 5 or gift bag 97 could include indicia 94, non-limiting examples being a greeting, note, signature, or other text or design. In some embodiments, the indicia 94 could indicate the location of the wireless interface 16 within the gift key 5 so that a user may properly position the gift key 5 with respect to another wireless interface 17 for communication purposes. The indicia 94 could be clearly visible after attachment to the bag 97 or through an opening along the bag 97. It is important to note that the gift key 5 could be placed along any surface of the gift bag 97. Flexible embodiments of the gift key 5 could be attached to areas including a gusset 101 or crease 102. It is understood that alternate embodiments of the gift key 5 could include a physical interface 7 rather than an antenna 91.

Figure 15:
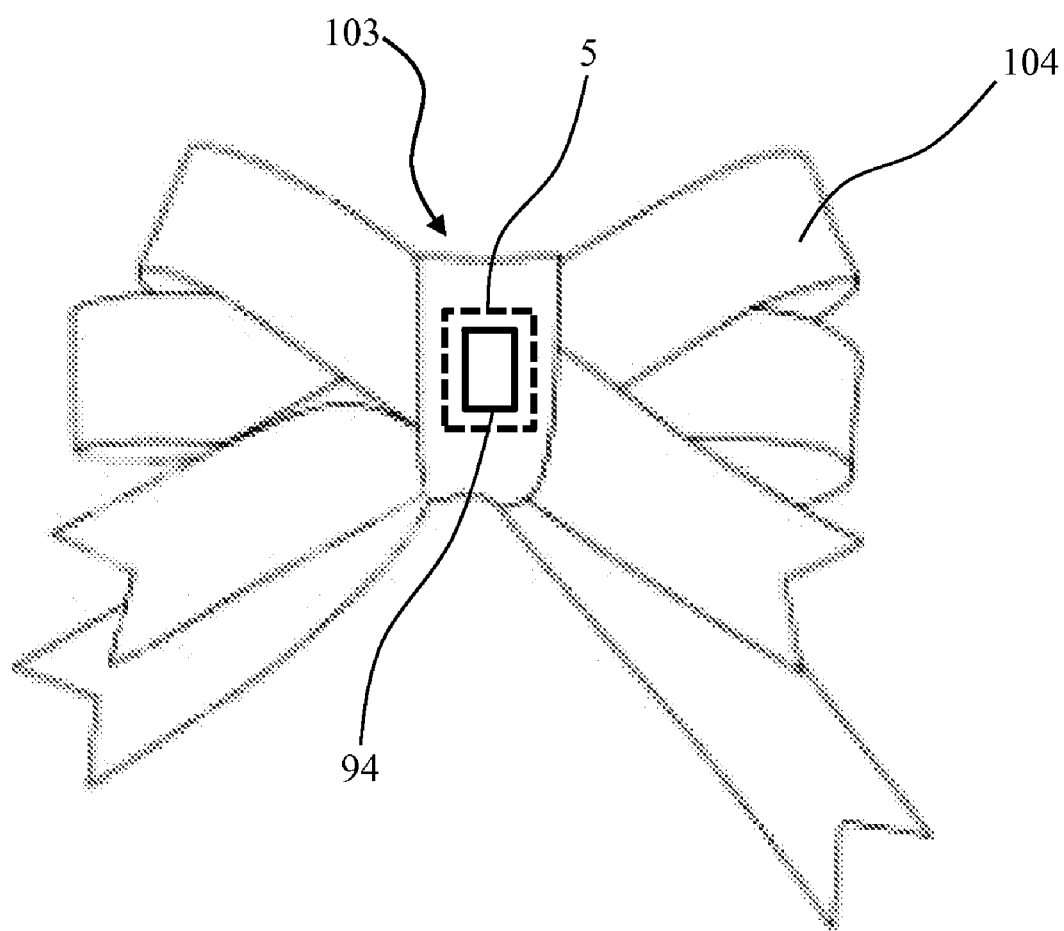
FIG. 15 is a front side perspective view showing a gift key attached to a gift bow in accordance with an embodiment of the invention.

Referring now to FIG. 15, the gift key 5 is shown attached to a ribbon 104 configured as a bow; however, other decorative configurations are possible. In these embodiments, the gift key 5 could be embedded within the ribbon 104 as similarly described for the embedded embodiment in FIG. 12, whereby the structure of the ribbon 104 functions as the decorative covers 8a, 8b. In other embodiments, the gift key 5 could be adhesively bonded to the surface of the ribbon 104 via a self-adhesive tab 103 similar to the adhesive layer 92 otherwise described in FIGS. 11b and 11c. In yet other embodiments, the gift key 5 could be disposed along the surface of a ribbon 104 so that the ribbon structure forms the decorative cover 8a. The gift key 5 could include indicia 94, non-limiting examples being a greeting, note, signature, or other text or design. In some embodiments, the indicia 94 could indicate the location of the wireless interface 16 within the gift key 5 so that a user may properly position the gift key 5 with respect to another wireless interface 17 for communication purposes. The indicia 94 could be clearly visible after attachment to the ribbon 104 or through an opening along the ribbon 104. It is important to note that the gift key 5 could be attached to the ribbon 104 so as to be concealed or readily visible when configured into a bow or other decorative shape. In these latter configurations, the gift key 5 is preferred to be flexible. It is understood that alternate embodiments of the gift key 5 could include a physical interface 7 rather than an antenna 91.

Figure 16:
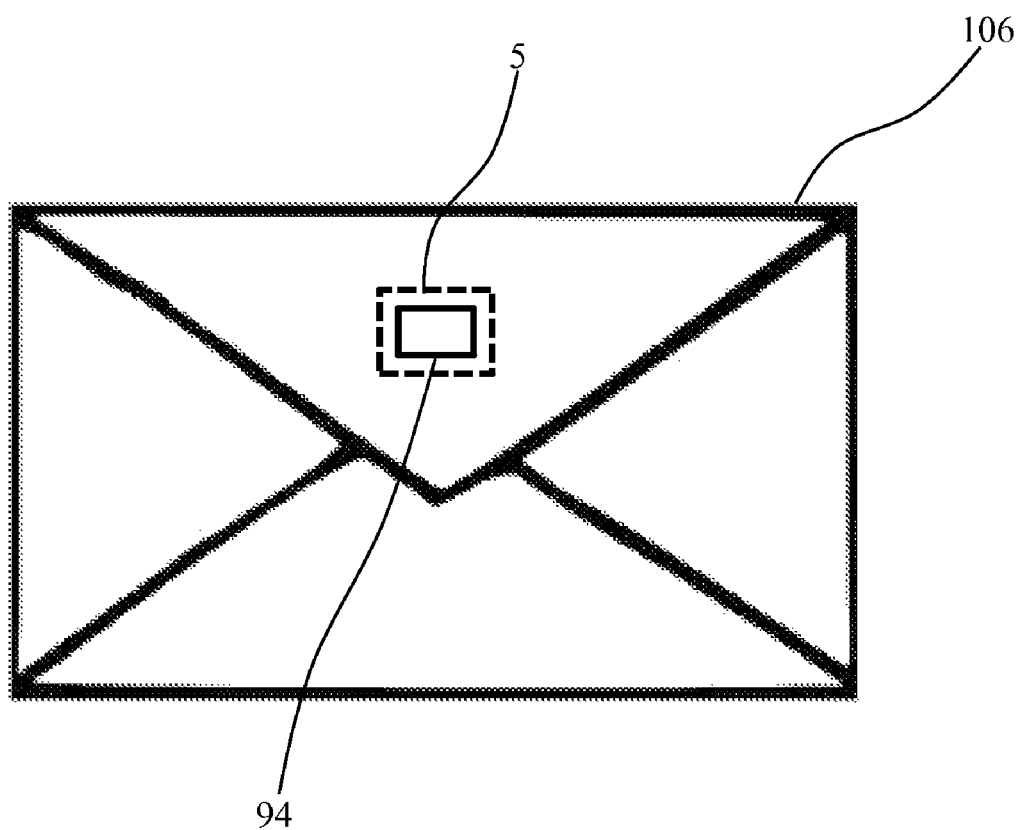
FIG. 16 is a front side perspective view showing a gift key attached to an envelope in accordance with an embodiment of the invention.

Referring now to FIG. 16, the gift key 5 is shown attached to an envelope 106. In these embodiments, the gift key 5 could be embedded within the envelope 106 as similarly described for the embedded configuration in FIG. 12, whereby the structure of the envelope 106 functions as the decorative covers 8a, 8b. In other embodiments, the gift key 5 could be adhesively bonded to the surface of the envelope 106 via an adhesive layer 92 as otherwise described in FIGS. 11b and 11c. In yet other embodiments, the gift key 5 could be disposed along the surface of an envelope 106 so that the envelope structure is the decorative cover 8a. The gift key 5 could include indicia 94, non-limiting examples being a greeting, note, signature, or other text or design. In some embodiments, the indicia 94 could indicate the location of the wireless interface 16 within the gift key 5 so that a user may properly position the gift key 5 with respect to another wireless interface 17 for communication purposes. The indicia 94 could be clearly visible after attachment to the envelope 106 or through an opening along the envelope 106. It is important to note that the gift key 5 could be attached to the envelope 106 so as to be concealed or readily visible. In these embodiments, the gift key 5 is preferred to be flexible. It is understood that alternate embodiments of the gift key 5 could include a physical interface 7 rather than an antenna 91.

Figure 17:
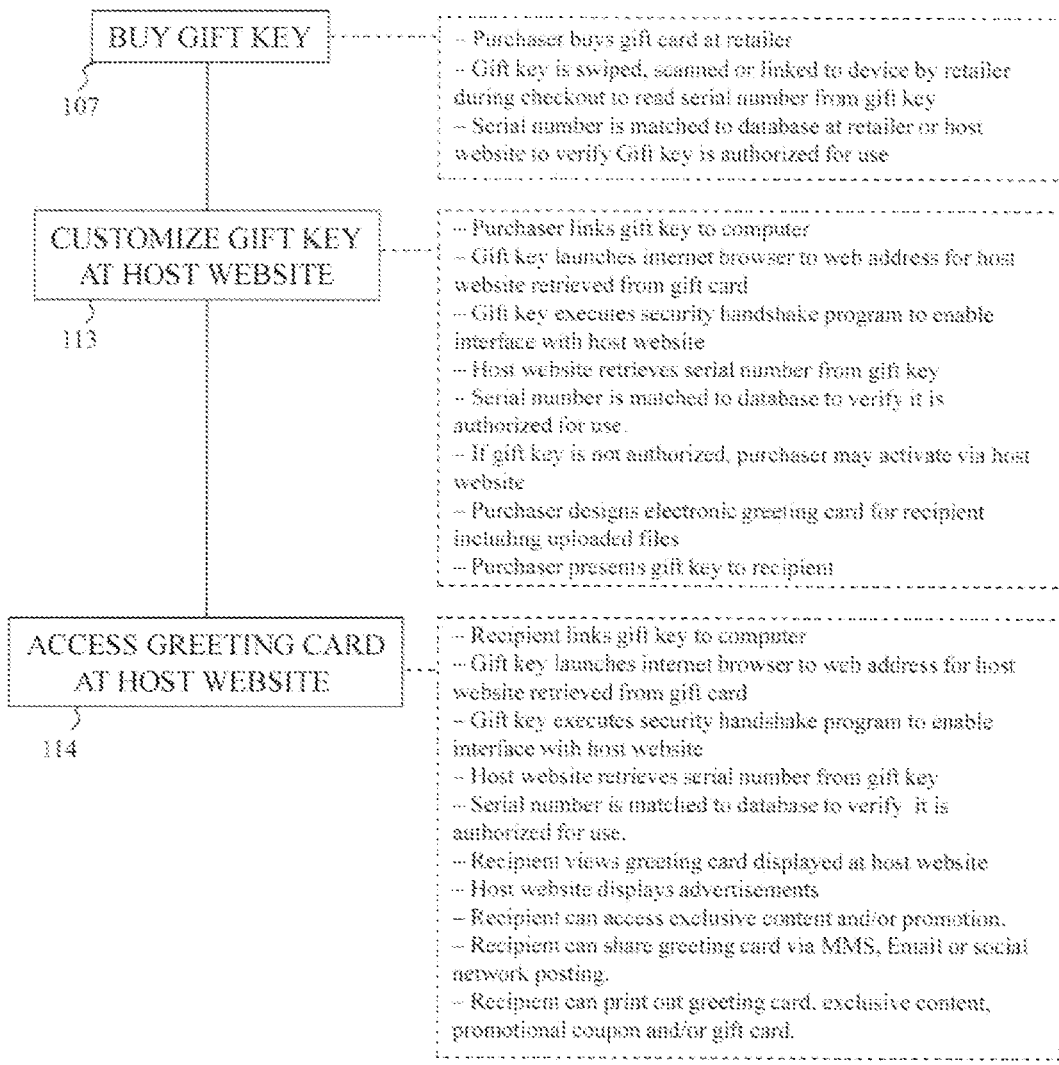
FIG. 17 is a flowchart illustrating transactional steps for viewing electronic greetings, obtaining promotions, and/or accessing exclusive content in accordance with an embodiment of the invention.

Referring now to FIG. 17, a flowchart is provided for one possible embodiment of system and method for a gift key 5 implemented transaction including a purchasing step 107, a customizing step 113, and an accessing step 114. This embodiment is a variation of the transaction described in FIG. 4. The flowchart is not meant to be exhaustive, but rather is merely illustrative to assist in describing aspects of a transaction in the manner described herein.

In step 107, a purchaser buys a gift key 5 from a retailer. The gift key 5 is swiped, scanned or linked to a device by retailer during checkout to read serial number from gift key 5. The serial number is matched to a database at a retailer system 4a-4f or a host system 3 to verify the gift key 5 is authorized for use.

In step 113, a purchaser links the gift key 5 to a local system 1. The gift key 5 launches an internet browser to a web address for host website retrieved from gift key 5. The gift key 5 executes a security handshake program to enable interface with host website. The host website retrieves a serial number from gift key which is matched to a database to verify it is authorized for use. If the gift key 5 is not authorized, then purchaser may activate the gift key 5 via host website. A purchaser then designs an electronic greeting card for a recipient which could include uploaded files. A purchaser presents the gift key 5 to recipient.

In step 114, a recipient links a gift key 5 to a local system 1. The gift key 5 launches an internet browser to web address for host system 3 retrieved from gift key 5. The gift key 5 executes a security handshake program to enable interface with host website. The host website retrieves a serial number from gift key 5. The serial number is matched to database to verify the gift key 5 is authorized for use. A recipient views an electronic greeting card displayed from host website. A host website 3 displays optional advertisements. A recipient could access exclusive content and/or promotion. A recipient could share greeting card via multimedia messaging service (MMS), email or social network posting. A recipient could print a physical or electronic copy of the greeting card, exclusive content, promotional coupon and/or gift card.

Figure 18:
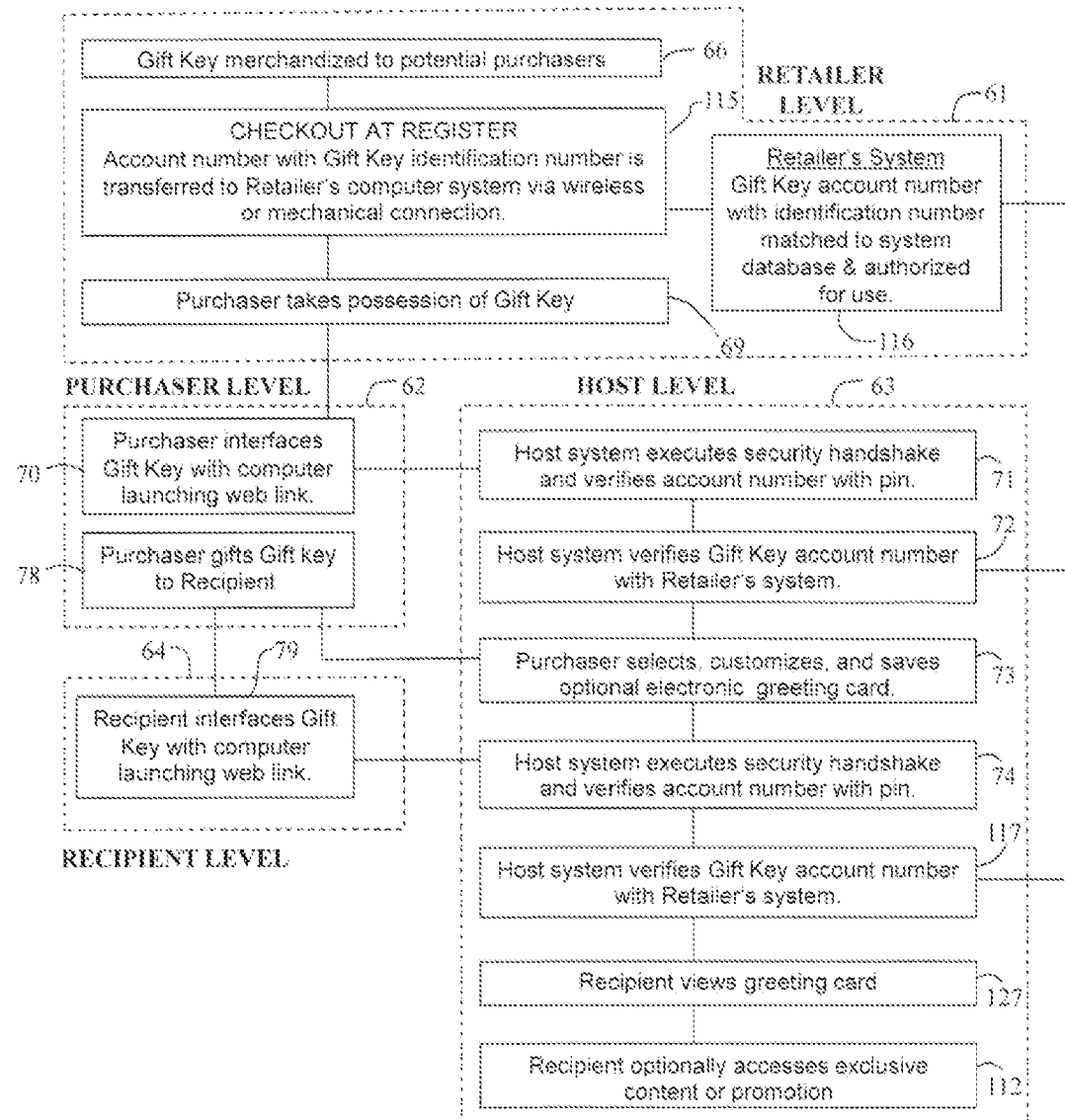
FIG. 18 is a flowchart illustrating interactions between retailer, purchaser, recipient, host, and network levels for viewing electronic greetings, obtaining promotions, and/or accessing exclusive content in accordance with an embodiment of the invention.

Referring now to FIG. 18, a flowchart is provided for one possible embodiment of a system and method for a gift key 5 implemented transaction. This embodiment is a variation of the transaction described in FIG. 9. The flowchart is not meant to be exhaustive, but rather is merely illustrative to assist in describing aspects of a transaction in the manner described herein.

Steps 66, 69, 115, and 116 are performed at the retailer level 61 and include both traditional in-store and electronically-based, on-line events. In step 66, the gift key is merchandized to prospective purchasers at retail locations for purchase. In step 115, the account number with gift key 5 identification number is transferred to a retailer 4a-4f via a wireless or mechanical connection. In step 116, account number with identification number is matched to a system database and authorized for use. In step 69, the purchaser takes possession and ownership of the gift key 5.

Steps 70 and 78 are performed at the purchaser level 62 and include physical events by the purchaser and intermediate or electronically implemented events, namely, steps 71-73, at the host level 63. In step 70, the purchaser either physically or wirelessly connects the gift key 5 to a local system 1. The gift key 5 automatically launches a webpage originating at the host level 63 and viewable at the purchaser level 62. In step 71, the host system 3 executes a security program to verify identifiers passed from the gift key 5 to the host. If identifiers fail verification, then access is denied. Otherwise, in step 72 the host system 3 verifies the store credit value available with the gift key 5 at the host level 63 and/or the retailer level 61 and could display FIG. 5. In step 73, the purchaser customizes and saves an electronic greeting card at the host level 63 and viewable at the purchaser level 62 via the web pages described in FIGS. 6 and 7. In step 78, the purchaser physically transfers possession and ownership of the gift key 5 to a recipient.

Step 79 is performed at the recipient level 64 including a physical event by the recipient and electronically implemented events, namely, steps 74, 117, 127, and 112, at the host level 63. In step 79, the recipient either physically or wirelessly connects the gift key 5 to a local system 1. The gift key 5 automatically launches a webpage originating at a host level 63 and viewable at the recipient level 64. In step 74, the host system 3 executes a security program to verify identifiers passed from the gift key 5 to the host. If identifiers fail verification, then access is denied. Otherwise, in step 117 the host 3 verifies the account number for the gift key 5 with the retailer system 4a-4f. In step 127, the recipient views an electronic greeting card as provided herein. In step 112, recipient could access exclusive content or promotions stored at the host level 63 and viewable at the recipient level 64 via webpage described in FIG. 8. Exclusive content could include, but is not limited to, video, game, picture, music, story, descriptive materials, or other works. Promotions could include an option, right, privilege, or license to purchase, receive, or use goods, products, or services at a predetermined price, discounted price, or at no cost. One example of a promotion could include a coupon. Promotions could be redeemed at a retail store or online. Exclusive content or promotion could be accessed from the host system 3, retailer system 4a-4f, or other third party website.

Figure 19:
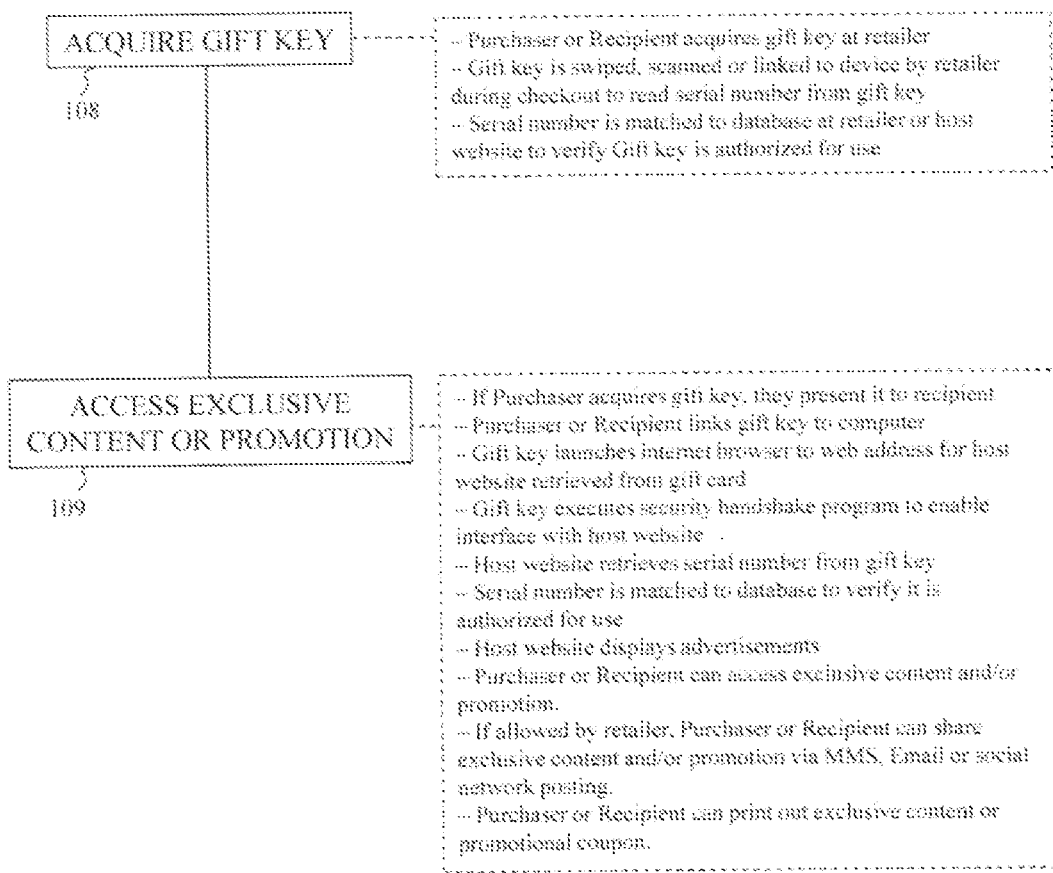
FIG. 19 is a flowchart illustrating transactional steps for obtaining promotions and/or accessing exclusive content in accordance with an embodiment of the invention.

Referring now to FIG. 19, a flowchart is provided for one possible embodiment of system and method for a gift key 5 implemented transaction including an acquiring step 108 and an accessing step 109. This embodiment is a variation of the transactions described in FIGS. 4 and 17. The flowchart is not meant to be exhaustive, but rather is merely illustrative to assist in describing aspects of a transaction in the manner described herein.

In step 108, purchaser or recipient acquires a gift key 5 from a retailer. The gift key 5 is swiped, scanned or linked to a device by a retailer during checkout to read a serial number from the gift key 5. The serial number is matched to a database at a retailer system 4a-4f or a host website 3 to verify the gift key 5 is authorized for use.

In step 109, if purchaser acquires a gift key 5, then purchaser presents the gift key 5 to a recipient. Purchaser or recipient links the gift key 5 to a local system 1. The gift key 5 launches an internet browser to a web address for a host system 3 retrieved from gift key 5. The gift key 5 executes a security handshake program to enable interface with host website. The host website retrieves a serial number from gift key 5. The serial number is matched to database to verify the gift key 5 is authorized for use. A host website displays advertisements. Purchaser or recipient could access exclusive content and/or promotion. If allowed by retailer system 4a-4f, purchaser or recipient could share exclusive content and/or promotion with others via multimedia messaging service (MMS), email, or social network posting. Recipient and purchaser could print a physical or electronic copy of exclusive content or promotional coupon.

Figure 20:
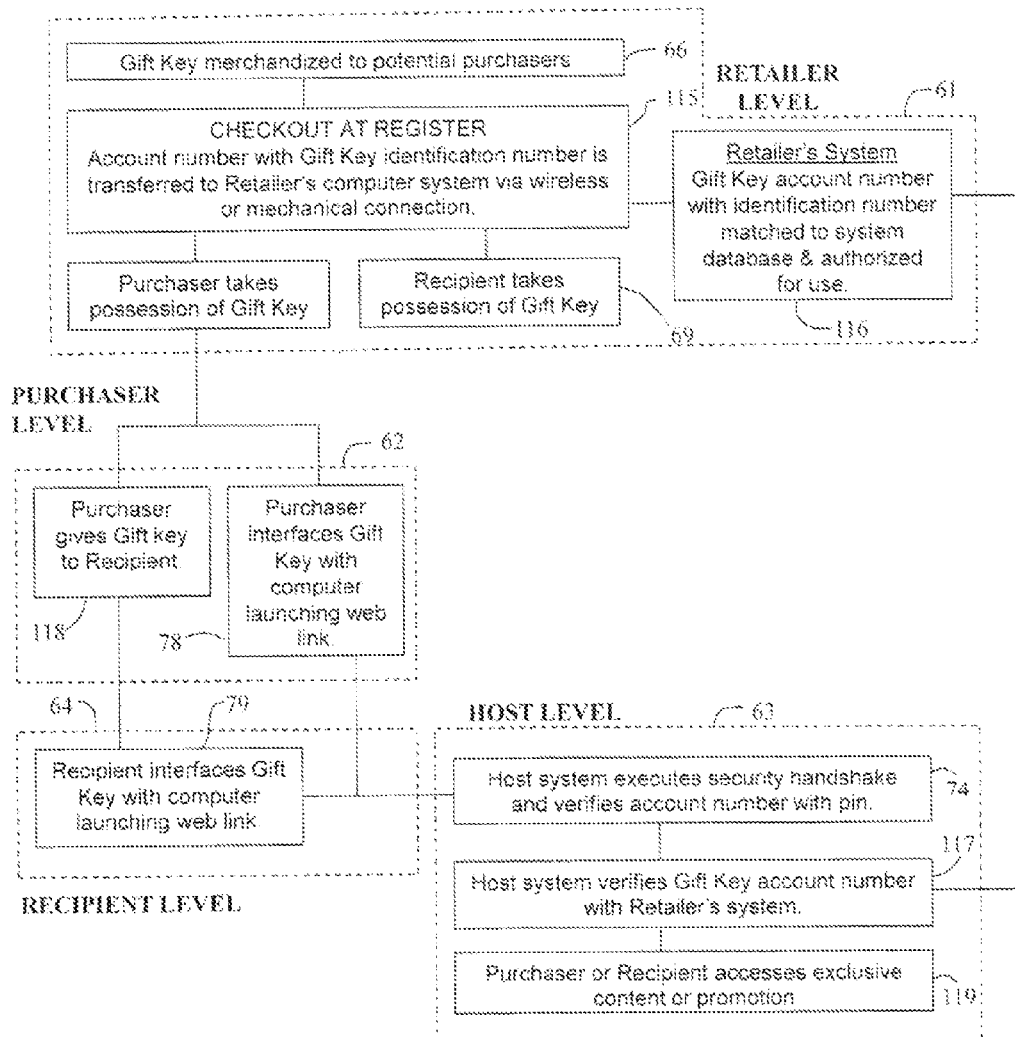
FIG. 20 is a flowchart illustrating interactions between retailer, purchaser, recipient, host, and network levels for obtaining promotions and/or accessing exclusive content in accordance with an embodiment of the invention.

Referring now to FIG. 20, a flowchart is provided for one possible embodiment of a system and method for a gift key 5 implemented transaction. This embodiment is a variation of the transactions described in FIGS. 9 and 18. The flowchart is not meant to be exhaustive, but rather is merely illustrative to assist in describing aspects of a transaction in the manner described herein.

Steps 66, 69, 115, and 116 are performed at the retailer level 61 and include both traditional in-store and electronically-based, on-line events. In step 66, the gift key is merchandized to potential purchasers at retail locations for purchase. In step 115, the account number with gift key 5 identification number is transferred to a retailer a4-af via a wireless or mechanical connection. In step 116, account number with identification number is matched to a system database and authorized for use. In step 69, the purchaser or recipient takes possession or ownership of the gift key 5.

Steps 118 and 78 are performed at the purchaser level 62 and include physical events by the purchaser. In step 70, the purchaser gives the gift key 5 to a recipient. In step 78, the purchaser interfaces the gift key 5 with a computer to launch a web link with further reference to steps 74, 117, and 119 at the host level.

Step 79 is performed at the recipient level 64 including a physical event by the recipient and electronically implemented events, namely, steps 74, 117, and 119, at the host level 63. In step 79, the recipient either physically or wirelessly connects the gift key 5 to a local system 1. The gift key 5 automatically launches a webpage originating at a host level 63 and viewable at the recipient level 64. In step 74, the host system 3 executes a security program to verify identifiers passed from the gift key 5 to the host system 3. If identifiers fail verification, then access is denied. Otherwise, in step 117 the host system 3 verifies the account number for the gift key 5 with the retailer system 4*a*-4*f*. In step 119, purchaser or recipient accesses exclusive content or promotion. Exclusive content could include, but is not limited to, video, game, picture, music, story, descriptive materials, or other works. Promotions could include an option, right, privilege, or license to purchase, receive, and/or use goods, products or services at a predetermined price or at no cost. Promotions could be redeemed at a retail store or online. Exclusive content or promotion could be accessed from the host system 3, retailer system 4*a*-4*f*, or other third party website.

Figure 21:
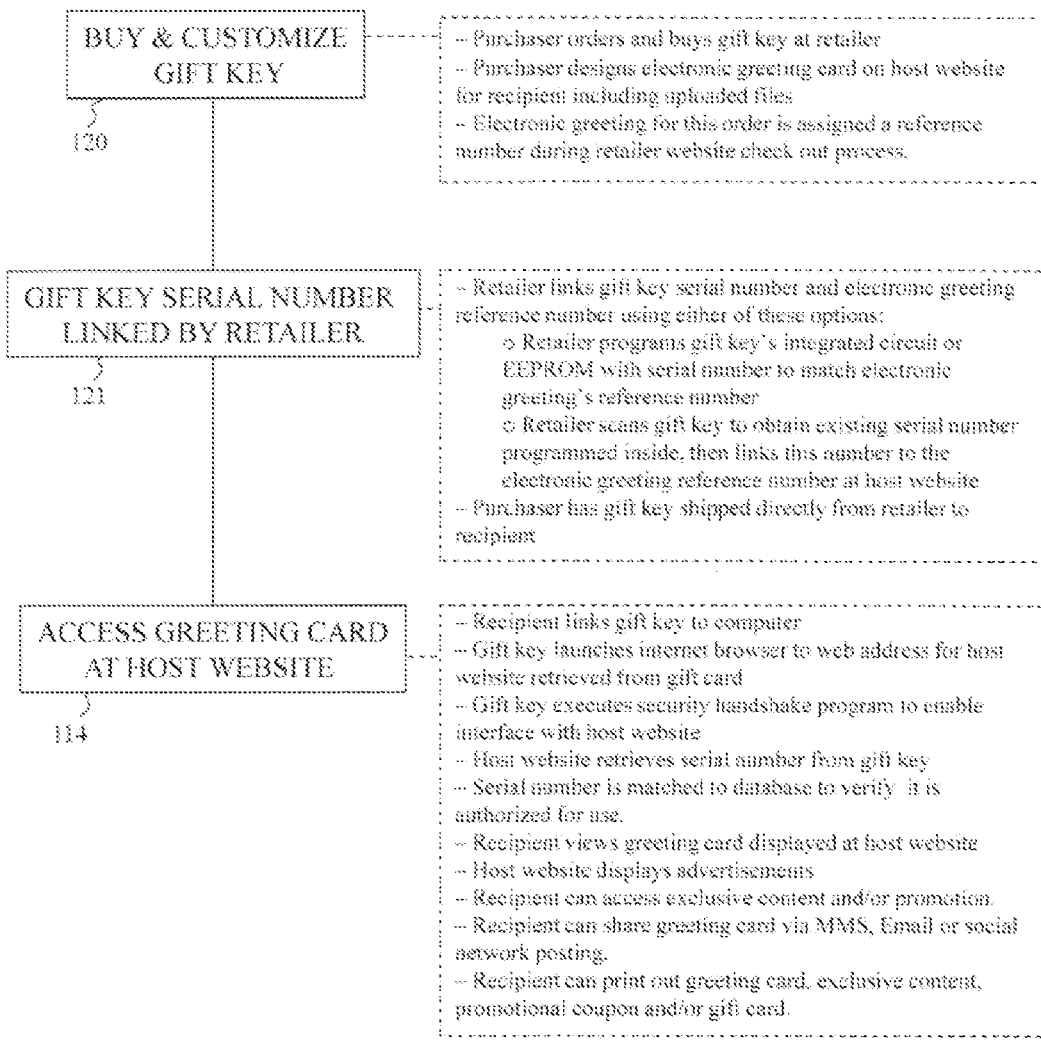
FIG. 21 is a flowchart illustrating transactional steps for viewing electronic greetings, obtaining promotions, and/or accessing exclusive content that employ gift key serial numbers linked by a retailer in accordance with an embodiment of the invention.

Referring now to FIG. 21, a flowchart is provided for one possible embodiment of system and method for a gift key 5 implemented transaction including a customizing step 120, a linking 121, and an accessing step 114. This embodiment is a variation of the transactions described in FIGS. 4, 17, and 19. The flowchart is not meant to be exhaustive, but rather is merely illustrative to assist in describing aspects of a transaction in the manner described herein.

In step 120, a purchaser orders or buys a gift key 5 from a retailer. Purchaser designs an electronic greeting card on a host website 3 for recipient including uploading files. The electronic greeting card for each order is assigned a reference number during the checkout process.

In step 121, a retailer links a gift key 5 serial number and electronic greeting reference number whereby either (1) a retailer programs integrated circuit or EEPROM within a gift key 5 with a serial number to match an electronic greeting card reference number or (2) a retailer scans a gift key 5 to obtain existing serial number programmed inside, then links this number to an electronic greeting reference number at a host website. A purchaser has the gift key 5 shipped directly from retailer to recipient In step 114, a recipient links gift key 5 to a local system 1. The gift key 5 launches an internet browser to a web address corresponding to a host website 3 retrieved from a gift key 5. The gift key 5 executes a security handshake program to enable interface with a host website. The host website retrieves a serial number from the gift key 5. The serial number is matched to database to verify the gift key 5 is authorized for use. A recipient views an electronic greeting card displayed at a host website. A host website displays optional advertisements. A recipient could then access exclusive content and/or promotion. A recipient could share an electronic greeting card via multimedia messaging service, email, or social network posting. A recipient could print a physical or electronic copy of the greeting card, exclusive content, promotional coupon and/or gift card.

Figure 22:
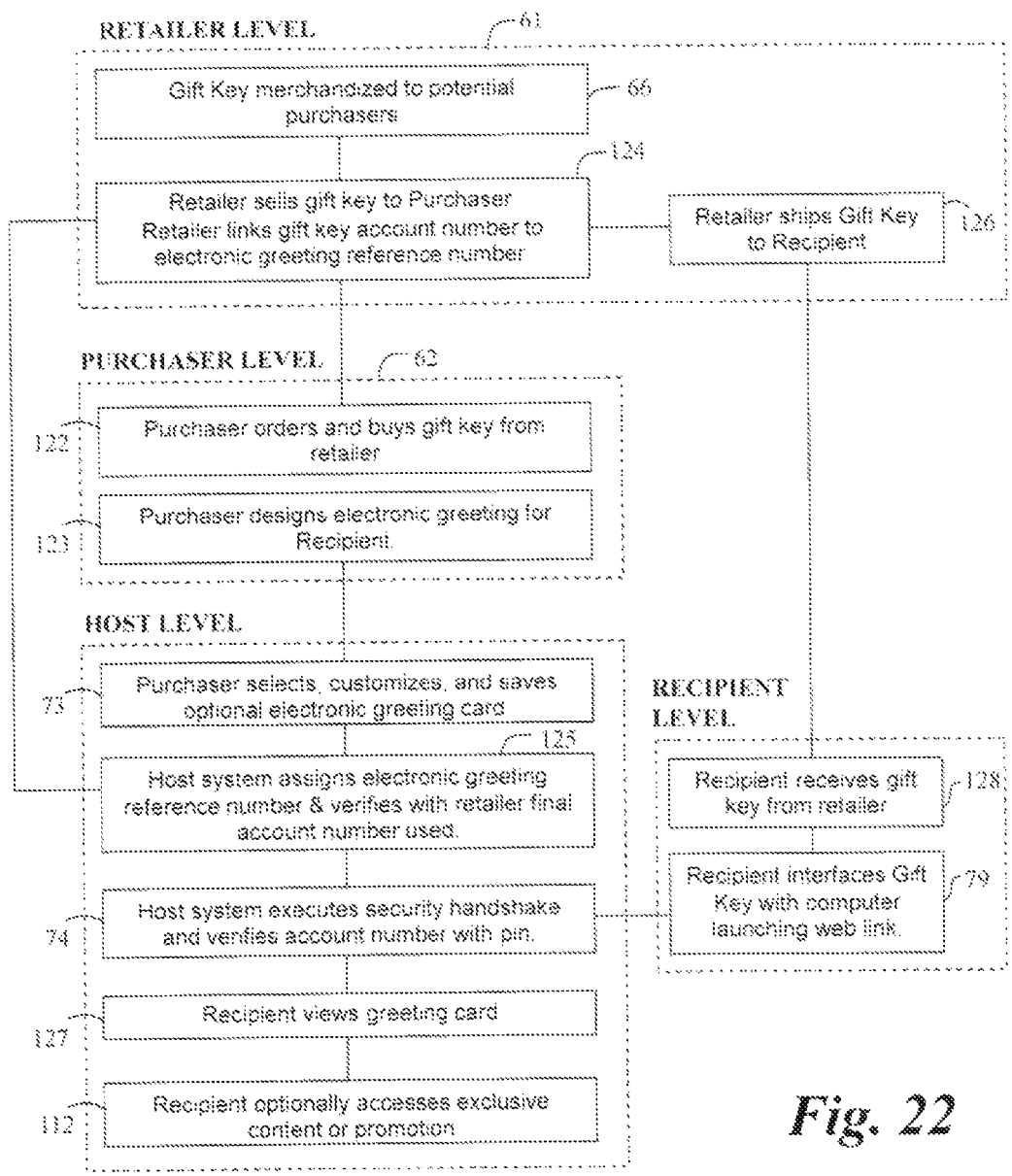
FIG. 22 is a flowchart illustrating interactions between retailer, purchaser, recipient, host, and network levels for viewing electronic greetings, obtaining promotions and/or accessing exclusive content that employ gift key serial numbers linked by a retailer in accordance with an embodiment of the invention.

Referring now to FIG. 22, a flowchart is provided for one possible embodiment of a system and method for a gift key 5 implemented transaction. This embodiment is a variation of the transactions described in FIGS. 9, 18, and 20. The flowchart is not meant to be exhaustive, but rather is merely illustrative to assist in describing aspects of a transaction in the manner described herein.

The retail level 61 includes steps 66, 124, and 126. In step 66, a gift key 5 is merchandized to potential customers. In step 124, a retailer sells a gift key 5 to a purchaser. A retailer links the gift key 5 account number to an electronic greeting reference number. In step 126, a retailer ships the gift key 5 to a recipient.

The purchaser level 62 includes steps 122 and 123. In step 122, a purchaser orders and buys a gift key 5 from a retailer. In step 123, a purchaser designs an electronic greeting for a recipient.

The recipient level includes steps 128 and 79. In step 128, a recipient receives a gift key 5 from a retailer. In step 79, a recipient interfaces a gift key 5 with a local system 1 launching a web link.

The host level includes steps 73, 125, 74, 127, and 112. In step 73, a purchaser selects, customizes, and saves an optional electronic greeting card. In step, 125, the host system 3 assigns an electronic greeting reference number and verifies with a retailer a final account number. In step 74, a host system executes a security handshake and verifies an account number with PIN. In step 127, a recipient views an electronic greeting card. In step 112, a recipient optionally accesses exclusive content or promotion.

Connectivity between the various levels is required to complete a transaction in FIG. 22. For example, step 124 in the retailer level 61 is linked to step 122 in the purchaser level 62 and step 125 in the host level. Step 126 in the retailer level 61 is linked to the step 128 in the recipient level. Step 74 in the host level is linked to step 79 in the recipient level. Furthermore, steps within each level are or could be linked. While preferred links are shown in FIG. 22, other event sequences are possible.

The description above indicates that a great degree of flexibility is offered in terms of the present invention. Although systems and methods have been described in considerable detail with reference to certain preferred versions thereof, other versions are possible. Therefore, the spirit and scope of the appended claims should not be limited to the description of the preferred versions contained herein.

What is claimed is:

1. A method of use for a gift key comprising the step of:
    enabling access via a local system to an electronic greeting card, an exclusive content, or a promotion from a remote system after said gift key is linked to said local system, said local system and said remote system communicable via a network, said gift key including a decorative cover, an integrated circuit, and an antenna or a physical interface, said integrated circuit and said antenna or said integrated circuit and said physical interface disposed on said decorative cover, said antenna or said physical interface communicable with said integrated circuit, said integrated circuit linkable to said local system via said antenna or said physical interface.

2. The method of claim 1, further comprising the step of:
    customizing said electronic greeting card by a purchaser.

3. The method of claim 1, further comprising the step of:
    viewing said electronic greeting card by a recipient or a purchaser.

4. The method of claim 1, further comprising the step of:
    viewing said exclusive content.

5. The method of claim 1, further comprising the step of:
    obtaining said promotion.

6. The method of claim 1, further comprising the step of:
    printing said exclusive content or said promotion to either a hard format or an electronic format.

7. The method of claim 1, further comprising the step of:
    delivering said gift key from a purchaser to a recipient.

8. The method of claim 1, further comprising the step of: delivering said gift key from a third party to a recipient prior to linkage of said gift key to said local system.

9. The method of claim 1, further comprising the step of: redeeming a store credit associated with said gift key via said remote system or a retail store.

10. The method of claim 1, further comprising the step of: sharing said electronic greeting card via a multimedia messaging service, an email, or a social network.

11. The method of claim 1, wherein said gift key is configured as a sticker and includes an adhesive backing.

12. The method of claim 1, wherein said gift key is disposed along a box, a bag, a ribbon, an envelope, a gift wrapping, or a wallet-size card.

13. The method of claim 1, wherein said exclusive content includes a video, a game, a picture, a song, a story, or a descriptive material.

14. The method of claim 1, wherein said promotion includes an option, a right, a privilege, or a license to purchase, receive, or use a good, a product, or a service at a predetermined price, a discounted price, or at no cost.

15. The method of claim 1, wherein said local system includes a personal computer, a laptop computer, a handheld computer, a mobile phone, a smart phone, a tablet computer, or a Smart TV system.

16. The method of claim 1, wherein said antenna or said integrated circuit is communicable with said local system via a radio frequency enabled format.

17. The method of claim 16, wherein said radio frequency enabled format is a Near Field Communication, an RFID, or a non-contact RF.

18. A method of use for a gift key comprising the step of: enabling access via a local system to a store credit from a remote system after said gift key is linked to said local system, said local system and said remote system communicable via a network, said gift key including a decorative cover, an integrated circuit, and an antenna or a physical interface, said integrated circuit and said antenna or said integrated circuit and said physical interface disposed on said decorative cover, said antenna or said physical interface communicable with said integrated circuit, said integrated circuit linkable to said local system via said antenna or said physical interface, said gift key disposed along a box, a bag, a ribbon, an envelope, a gift wrapping, a three dimensional object, a wallet-size card, or configured as a sticker with an adhesive backing.

19. The method of claim 18, wherein said store credit and an electronic greeting card are accessible from said remote system after said gift key is linked to said local system.

20. A system for accessing an electronic greeting card, an exclusive content, or a promotion comprising:
(a) a local system communicable with a remote system via a network; and
(b) a gift key including a decorative cover, an integrated circuit, and an antenna or a physical interface, said integrated circuit and said antenna or said integrated circuit and said physical interface disposed on said decorative cover, said antenna or said physical interface communicable with said integrated circuit, said integrated circuit linkable to said local system via said antenna or said physical interface, said electronic greeting card, said exclusive content, or said promotion accessible after said gift key is linked to said local system.

21. The system of claim 20, wherein said antenna or said integrated circuit is communicable with said local system via a radio frequency enabled format.

22. The system of claim 20, wherein said radio frequency enabled format is a Near Field Communication, an RFID, or a non-contact RF.

23. The system of claim 20, wherein said local system is a personal computer, a laptop computer, a handheld computer, a mobile phone, a smart phone, a tablet computer, or a Smart TV system.

24. The system of claim 20, wherein said gift key is configured as a sticker with an adhesive backing.

25. The system of claim 20, wherein said integrated circuit and said antenna or said integrated circuit and said physical interface enclosed within said decorative cover, said gift key being a wallet-size card that has access to a store credit.

26. The system of claim 20, wherein said gift key is disposed along a box, a bag, a ribbon, an envelope, or a gift wrapping.

27. The system of claim 20, wherein said electronic greeting card is sharable via a multimedia messaging service, an email, or a social network.

28. A system for accessing a store credit comprising:
(a) a local system communicable with a remote system via a network; and
(b) a gift key including a decorative cover, an integrated circuit, and an antenna or a physical interface, said integrated circuit and said antenna or said integrated circuit and said physical interface disposed on said decorative cover, said antenna or said physical interface communicable with said integrated circuit, said integrated circuit linkable to said local system via said antenna or said physical interface, said store credit accessible after said gift key is linked to said local system, said gift key disposed along a box, a bag, a ribbon, an envelope, a gift wrapping, a wallet-size card, a three dimensional object, or configured as a sticker with an adhesive backing.

29. The system of claim 28, wherein said store credit and an electronic greeting card are accessible from said remote system after said gift key is linked to said local system.

30. A gift key comprising:
(a) a decorative cover;
(b) an integrated circuit disposed along said decorative cover; and
(c) an antenna or a physical interface disposed along said decorative cover, said antenna or said physical interface communicable with said integrated circuit, said integrated circuit wirelessly linkable to a local system via said antenna or physically linkable to said local system via said physical interface, said local system communicable with a remote system via a network, said gift key enabling access to an electronic greeting card, an exclusive content, or a promotion from said remote system after linkage of said gift key to said local system.

31. The gift key of claim 30, wherein said antenna or said integrated circuit is communicable with said local system via a radio frequency enabled format.

32. The gift key of claim 31, wherein said radio frequency enabled format is a Near Field Communication, an RFID, or a non-contact RF.

33. The gift key of claim 30, wherein said local system is a personal computer, a laptop computer, a handheld computer, a mobile phone, a smart phone, a tablet, or a Smart TV system.

34. The gift key of claim 30, wherein said gift key is configured as a sticker.

35. The gift key of claim 34, further comprising:
(d) an adhesive layer disposed along a portion of said decorative cover; and
(e) a backing layer removably disposed along said adhesive layer.

36. The gift key of claim 30, wherein said integrated circuit and said antenna or said integrated circuit and said physical interface are enclosed within said decorative cover, said gift key being a wallet-size card that has access to a store credit.

37. The gift key of claim 30, wherein said gift key is disposed along a box, a bag, a ribbon, an envelope, or a gift wrapping.

38. A gift key comprising:
(a) a decorative cover;
(b) an integrated circuit disposed along said decorative cover; and
(c) an antenna or a physical interface disposed along said decorative cover, said antenna or said physical interface communicable with said integrated circuit, said integrated circuit wirelessly linkable to a local system via said antenna or physically linkable to said local system via said physical interface, said local system communicable with a remote system via a network, said gift key enables access to a store credit from said remote system after linkage of said gift key to said local system, said gift key disposed along a box, a bag, a ribbon, an envelope, a gift wrapping, a wallet-size card, a three dimensional object, or configured as a sticker with an adhesive backing.

39. The gift key of claim 38, wherein said gift key enables access to said store credit and an electronic greeting card from said remote system after linkage of said gift key to said local system.

* * * * *